United States Patent
Elgersma et al.

(10) Patent No.: US 6,532,422 B1
(45) Date of Patent: Mar. 11, 2003

(54) SIMULTANEOUS INJECTION METHOD AND SYSTEM FOR A SELF-BALANCING ROTATABLE APPARATUS

(75) Inventors: Michael R. Elgersma, Plymouth, MN (US); Dennice F. Gayme, St. Paul, MN (US); Theresa C. Jenne, Monticello, MN (US); Kevin J. Stalsberg, White Bear Lake, MN (US)

(73) Assignee: Honeywell International, Inc., Morristown, NJ (US)

(*) Notice: Subject to any disclaimer, the term of this patent is extended or adjusted under 35 U.S.C. 154(b) by 77 days.

(21) Appl. No.: 09/896,763

(22) Filed: Jun. 29, 2001

(51) Int. Cl.⁷ ............................ D06F 37/22; G06F 15/00
(52) U.S. Cl. ..................... 702/41; 68/23.2; 8/159; 74/594 F
(58) Field of Search ................. 702/41, 86, 94; 68/23.1, 23.2, 24, 12.06, 12.14, 12.16; 8/159, 158; 134/18, 25.2, 56 D, 57 D; 74/573 F, 573 R, 572, 574; 73/458

(56) References Cited

U.S. PATENT DOCUMENTS

| | | | |
|---|---|---|---|
| 3,799,348 A | 3/1974 | Mazza ........................ 210/144 |
| 3,983,035 A | 9/1976 | Arkeveld et al. ........... 210/138 |
| 4,000,658 A | 1/1977 | Schmidt ...................... 73/490 |
| 4,157,781 A | 6/1979 | Maruyama ................ 233/23 A |
| 4,322,641 A | 3/1982 | Packard ...................... 307/521 |
| 4,694,156 A | 9/1987 | Swanberg .................... 250/214 |
| 4,991,247 A | 2/1991 | Castwall et al. ............... 8/158 |
| 5,150,314 A | 9/1992 | Garratt et al. ......... 364/571.02 |
| 5,280,660 A | 1/1994 | Pellerin et al. ................ 8/158 |
| 5,325,677 A | 7/1994 | Payne et al. ............... 68/12.04 |
| 5,376,063 A | 12/1994 | Greenstein .................... 494/37 |
| 5,490,436 A | 2/1996 | Coyne et al. ................. 74/573 |
| 5,561,993 A | 10/1996 | Elgersma et al. ............ 68/23.2 |
| 5,582,040 A | 12/1996 | Khan .......................... 68/23.2 |
| 5,692,313 A | 12/1997 | Ikeda et al. .................... 34/58 |
| 5,715,731 A | 2/1998 | Koch ........................... 74/573 |
| 5,729,025 A | 3/1998 | Erickson et al. ............. 250/574 |
| 5,731,868 A | 3/1998 | Okey et al. .................... 356/73 |

(List continued on next page.)

FOREIGN PATENT DOCUMENTS

EP  1 036 875 A2  9/2000  ........... D06F/39/08

Primary Examiner—Kamini Shah
(74) Attorney, Agent, or Firm—Kris T. Fredrick; Kermit D. Lopez; Luis M. Ortiz

(57) ABSTRACT

A method and system for balancing a rotating device or rotating system having a rotatable member and a shaft attached to the rotatable member, such that balancing is based on system response to simultaneous control actions to place mass, such as for example, fluid, at predetermined locations within the rotating system or rotating device. Mass can be simultaneously placed at predetermined locations within the rotating system. A system model of measured force and motion parameters can then be calculated in response to simultaneously placing mass at predetermined locations within the rotating system, in order to determine a required correction necessary to place the rotating system in a balanced state. Force can be measured at predetermined locations throughout the rotating system or rotating device in response to simultaneously placing the mass at the predetermined locations within the rotating system or rotating device. Motion can also be measured at predetermined locations throughout the rotating system or rotating device in response to simultaneously placing the mass at predetermined locations within the rotating system or rotating device. A matrix of measured force and motion parameters can be calculated based on independent perturbations of the rotating system. Additionally, an independence or rank criterion may be formulated to determine whether consecutive control actions are different enough from one another toexcite the system in independent directions, thereby forming a model that is sufficiently representative of the dynamics of said rotating system.

24 Claims, 10 Drawing Sheets

U.S. PATENT DOCUMENTS

| | | |
|---|---|---|
| 5,757,481 A | 5/1998 | O'Brien et al. ............. 356/243 |
| 5,761,932 A | 6/1998 | Kim ........................... 68/23.2 |
| 5,761,933 A | 6/1998 | Kim et al. ................... 68/23.2 |
| 5,765,402 A | 6/1998 | Ikeda et al. ................ 68/12.06 |
| 5,800,628 A | 9/1998 | Erickson et al. ............. 134/18 |
| 5,850,748 A | 12/1998 | Kim et al. ................... 68/23.2 |
| 5,857,360 A * | 1/1999 | Kim et al. ................... 68/23.2 |
| 5,862,553 A | 1/1999 | Harberl et al. ................. 8/159 |
| 5,870,907 A | 2/1999 | Cho ........................... 68/23.1 |
| 5,893,280 A | 4/1999 | Honda et al. .............. 68/12.06 |
| 5,913,951 A | 6/1999 | Herr et al. ..................... 8/158 |
| 5,921,148 A | 7/1999 | Howell ........................ 74/573 |
| 5,923,433 A | 7/1999 | Giuffre et al. .............. 356/440 |
| 5,957,144 A | 9/1999 | Neff et al. ................ 134/56 D |
| 5,960,804 A | 10/1999 | Cooper et al. ............ 134/56 D |
| 5,979,236 A | 11/1999 | Hong et al. .................. 73/458 |
| 6,007,640 A | 12/1999 | Neff et al. ..................... 134/18 |
| 6,029,300 A | 2/2000 | Kawaguchi et al. ........... 8/159 |
| 6,047,428 A | 4/2000 | Min ............................... 8/159 |
| 6,077,423 A | 7/2000 | Roy et al. ................... 210/121 |
| 6,082,151 A | 7/2000 | Wierzba et al. .............. 68/23.2 |
| 6,129,768 A | 10/2000 | Johnson et al. ................. 8/159 |
| 6,144,447 A | 11/2000 | Ohman et al. ............... 356/246 |
| 6,148,647 A | 11/2000 | Kabeya et al. ................ 68/140 |
| 6,159,384 A | 12/2000 | Roberts et al. ............. 210/741 |
| 6,295,678 B1 * | 10/2001 | Jonsson et al. ................. 8/159 |
| 6,381,791 B1 * | 5/2002 | French et al. ................... 8/159 |
| 6,393,918 B2 * | 5/2002 | French et al. ................. 73/660 |
| 6,418,758 B1 * | 7/2002 | Ikeda et al. ................ 68/12.06 |
| 6,130,928 A1 | 10/2002 | Jamzadeh et al. ............. 377/23 |
| 6,477,867 B1 * | 11/2002 | Collecutt et al. .......... 68/12.06 |

* cited by examiner

SIMULTANEOUS INJECTION METHOD AND SYSTEM FOR A SELF-BALANCING ROTATABLE APPARATUS

RELATED APPLICATIONS

This application is related to co-pending and co-owned patent application entitled: "Method and Apparatus for Reducing Microprocessor Speed Requirements in Data Acquisition Applications," U.S. Ser. No. 09/792,996, filed on Feb. 26, 2001.

TECHNICAL FIELD

The present invention relates generally to rotatable members that are able to achieve balanced conditions throughout a range of rotational speeds. The present invention also relates to methods and systems for dynamically balancing rotatable members through the continual determination of out-of-balance forces and motion to thereby take corresponding counter balancing action. The present invention additionally relates to methods and systems in which inertial masses are actively shifted within a body rotating on a shaft in order to cancel rotational imbalances associated with the shaft and bodies co-rotating thereon. The present invention additionally relates to methods and system for dynamic balancing utilizing concurrent control actuator actions.

BACKGROUND OF THE INVENTION

Mass unbalance in rotating machinery leads to machine vibrations that are synchronous with the rotational speed. These vibrations can lead to excessive wear and to unacceptable levels of noise. Typical imbalances in large, rotating machines are on the order of one inch-pound.

It is a common practice to balance a rotatable body by adjusting a distribution of moveable, inertial masses attached to the body. Once certain types of bodies have been balanced in this fashion, they will generally remain in balance only for a limited range of rotational velocities. A tire, for instance, can be balanced once by applying weights to it. This balanced condition will remain until the tire hits a very big bump or the weights are removed. A centrifuge for fluid extraction, however, can change the amount of balance as more fluid is extracted.

Many machines are also configured as freestanding spring mass systems in which different components thereof pass through resonance ranges until the machine is out of balance. Additionally, such machines may include a rotating body flexibly located at the end of a shaft rather than fixed to the shaft as in the case of a tire. Thus, moments about a bearing shaft may also be created merely by the weight of the shaft. A flexible shaft rotating at speeds above half of its first critical speed can generally assume significant deformations, which add to the imbalance. This often poses problems in the operation of large turbines and turbo generators.

Machines of this kind usually operate above their first critical speed. As a consequence, machines that are initially balanced at relatively low speeds may tend to vibrate excessively as they approach full operating speed. Additionally, if one balances to an acceptable level rather than to a perfect condition (which is difficult to measure), the amount of remaining balance will progressively apply force as the speed increases. This increase in force is due to the fact that $F \alpha r\omega^2$, (i.e., note that F is the out of balance force, r is the radius of the rotating body and $\omega$ is its rotational speed).

The mass unbalance distributed along the length of a rotating body gives rise to a rotating force vector at each of the bearings that support the body. In general, the force vectors at respective bearings are not in phase. At each bearing, the rotating force vector may be opposed by a rotating reaction force, which can be transmitted to the bearing supports as noise and vibration.

The purpose of active, dynamic balancing is to shift an inertial mass to the appropriate radial eccentricity and angular position for canceling the net mass unbalance. At the appropriate radial and angular distribution, the inertial mass can generate a rotating centrifugal force vector equal in magnitude and phase to the reaction force referred to above.

Many different types of balancing schemes are known to those skilled in the art. When rotatable objects are not in perfect balance, nonsymmetrical mass distribution creates out-of-balance forces because of the centrifugal forces that result from rotation of the object. Although rotatable objects find use in many different applications, one particular application is a rotating drum of a washing machine.

U.S. Pat. No. 5,561,993, which issued to Elgersma et al. on Oct. 22, 1996, and is incorporated herein by reference, discloses a self-balancing rotatable apparatus. Elgersma et al. disclosed a method and system for measuring forces and motion via accelerations at various locations in a system. The forces and moments were balanced through the use of a matrix manipulation technique for determining appropriate counterbalance forces located at two axial positions of the rotatable member. The method and system described in Elgersma et al. accounted for possible accelerations of a machine, such as a washing machine, which could not otherwise be accomplished if the motion of the machine were not measured. Such a method and system was operable in association with machines that are not rigidly attached to immovable objects, such as concrete floors. The algorithm disclosed by Elgersma et al. permitted counterbalance forces to be calculated even though a washing machine is located on a moveable floor structure combined with carpet padding and carpets between the washing machine and a rigid support structure.

U.S. Pat. No. 5,561,993 thus described a dynamic balance control algorithm for balancing a centrifuge for fluid extraction. To accomplish such balance control, mass was placed sequentially in the back and front planes and mathematical model and balancing algorithm thereof was developed, such that the dynamics of the system were divided into two columns based on whether mass was placed in a front plane (i.e., column 2) or the back plane (i.e., column 1) of the spinner. A matrix was thus calculated utilizing multiple rows based on force and acceleration measurements and parameters before and after a prior control action. Each counterbalance mass correction depended on a prior control action or injection.

A counterbalance procedure was developed wherein a known quantity of water or fluid mass was separately injected at known positions within the system. Acceleration and force measurements were taken to determine the degree of perturbation caused by the injections. That perturbation, along with further sensor measurement, was utilized to determine the required correction counterbalance that would place the rotating assembly in a balanced condition. After each counterbalance injection was made, its perturbation effect was used as a test injection for the next counterbalance calculation. Thus, the prior perturbations created by the latest counterbalance could be utilized under many conditions for purposes of determining the next location and magnitude for a counterbalance injection. Such a technique for balancing a rotating system or apparatus did not, however, permit fluid mass to be simultaneously placed in multiple (e.g., front and back) planes of the system in order to perform counterbalance actions and measurements necessary to place the system in a balanced state.

Based on the foregoing, it can be appreciated that previous methods for dynamically balancing a rotatable member have experienced limitations in the degree of balance that can be achieved, the time to acquire balance, and in the rotational speeds under which they are workable. It has, therefore, become apparent to the present inventors that it would be desirable to correct imbalances in a dynamic rotatable self-balancing apparatus or rotating system, such as a washing machine, for example, utilizing concurrent control actuator actions exemplified by simultaneous front and back axial plane injection techniques.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

It is one aspect of the present invention to provide methods and systems in which rotatable members can achieve balanced conditions throughout a range of rotational speeds.

It is another aspect of the present invention to provide methods and systems for dynamically balancing rotatable members through the continual determination of out-of-balance forces and motion to thereby take corresponding counter balancing action.

It is still another aspect of the present invention to provide methods and system for dynamic balancing utilizing concurrent control actuator actions or simultaneous injections.

The above and other aspects are achieved as is now described. Methods and systems are disclosed herein for balancing a rotating system having a rotatable member and a shaft attached to the rotatable member. Balancing is generally based on a system response to control actions accomplished through the concurrent actuation of multiple control actuators (e.g., simultaneous injections) for placing mass at predetermined locations within the rotating system. Fluid mass can be simultaneously injected at predetermined locations within the rotating system. A matrix of measured force and motion parameters can then be calculated in response to simultaneously placing mass at predetermined locations within the rotating system, in order to determine a required correction necessary to place the rotating system in a balanced state. Force can be measured at predetermined locations within the rotating system in response to simultaneously injecting the fluid mass at the predetermined locations within the rotating system.

Motion (e.g., acceleration) can also be measured at predetermined locations within the rotating system in response to simultaneously injecting the fluid mass at predetermined locations within the rotating system. The matrix of measured force and motion parameters can be calculated based on independent perturbations of the rotating system.

An independence or rank criterion, implemented as a complex vector angle criterion for the case of two perturbations to the rotating system, can also be utilized to determine whether each consecutive injection is different enough from the previous injection (i.e., can excite the system in an independent direction) to form a model that is sufficiently representative of the dynamics of the rotating system. Additionally, the complex vector angle between two test vectors or the rank of a matrix containing more than two test vectors can be calculated based on a rank criterion of a matrix containing one or more test vectors.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

The present invention involves the formulation of a general model to predict the location of an out-of-balance occurrence based on known perturbations at predetermined locations of a rotatable member of a rotating system or rotating device, such as, for example, a washing machine. The basic configuration and concepts explained in U.S. Pat. No. 5,561,993 are discussed herein, but do not limit the scope of the present invention, including preferred embodiments discussed herein. Features taught in U.S. Pat. No. 5,561,993 are discussed herein for illustrative purposes only, in order to explain the foundation from which the present invention was derived. Those skilled in the art can appreciate that such features, including figure, text, descriptions, equations and tables thereof do not limit the scope of the present invention.

Figure 1:
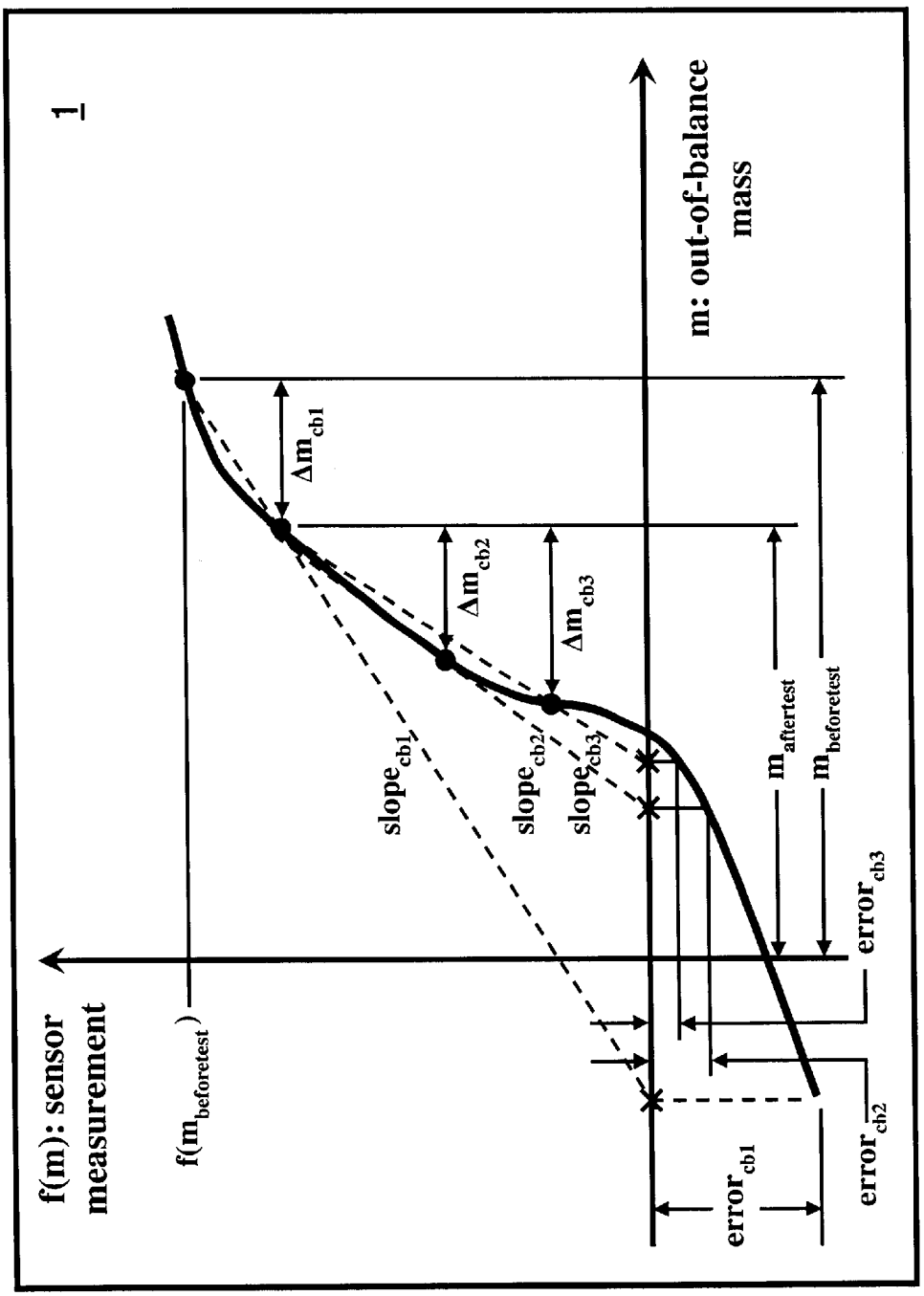
FIG. 1 depicts a plot of a non-linear system, in accordance with preferred embodiments of the present invention.

FIG. 1 depicts a plot of a non-linear system 1, in accordance with preferred embodiments of the present invention. Given a very simple (e.g., one-dimensional non-linear system, such as non-linear system 1, the system can be balanced when the sensor measurement, f(m), is driven to zero. A primary objective of such a system is generally to find a value for a counterbalance Δm, such that the sensor measurement f(m) is driven to zero, i.e., f(m)=0. Utilizing a Taylor's series expansion in the vicinity of the anticipated operating range and neglecting second order and higher terms, results in a linear model: straight line of the form y=b+mx. The system can be perturbed, $\Delta m_{cb}$, to determine the slope of the linear model, and the counterbalance Δm for driving f(m) to zero can be estimated. The linear model can be written to reflect the example illustrated in FIG. 1, where several possible line estimates are shown; equation 1 expresses this relationship.

$$f(m_{next}) \approx f(m_{aftertest}) + \left(\frac{\partial f(m)}{\partial m}\right) \cdot (m_{next} - m_{aftertest}) \quad (1)$$

Those skilled in the art can appreciate that $f(m_{next})$ represents the desired sensor measurement. In addition, $f(m_{aftertest})$ can represent the sensor measurement after placement of a test mass or a prior balance-control action. Note that the test mass or "mass" can be a fluid, gel-type mass, or any mass capable of being dynamically inserted into and removed from the system to provide a balance. Those skilled in the art can appreciate that such a mass can be comprised of other types of material, not necessarily only fluid-based masses. The variable m generally represents the out-of-balance occurrence in the system. For example, the variable $m_{aftertest}$ generally represents the out-of-balance mass after placement of a test weight ($\Delta m_{test}$), and the change in m (i.e., $\Delta m = m_{next} - m_{aftertest}$), is the counterbalance mass required to achieve a desired sensor measurement, ($f(m_{next})=0$). The control action involves moving in the direction of the estimated counterbalance and updating the system model and the required counterbalance estimate as control progresses. Those skilled in the art can appreciate that this control implementation of equation 1 represents the well-known Newton Raphson iteration method.

Since the objective is to find $f(m_{next})=0$, the general form of the equation reduces to:

$$m_{next} = m_{aftertest} - \left(\left[\frac{\partial f(m)}{\partial m}\right]\right)^{-1} \cdot f(m_{aftertest}) \quad (2)$$

where $m_{next}$ is the solution or system out of balance needed to make $f(m_{next})=0$ or drive the sensor measurement to zero. Thus, the estimated mass change $m_{cb}$ generally required for counterbalance action is illustrated in equation 3.

$$m_{cb} = m_{next} - m_{aftertest} = -f(m_{aftertest}) / \left(\frac{\partial f}{\partial m}(m_{aftertest})\right) \quad (3)$$

The partial derivative, or slope of the sensor function, can be found by perturbing the system. This is generally illustrated in equation 4, which represents the change in sensor measurements due to placement of the test weight ($\Delta m_{test} = m_{aftertest} - m_{beforetest}$).

$$\frac{\partial f}{\partial m}(m_{aftertest}) = \frac{f(m_{aftertest}) - f(m_{beforetest})}{m_{aftertest} - m_{beforetest}} \quad (4)$$

Combining equations 3 and 4 can result in a generalized form shown in equation 5 below, which is generally expressed in an expanded notion of multiple inputs and outputs.

$$[f(m_{aftertest})] = -\left[\frac{\partial f(m)}{\partial m}\right] \cdot [\Delta m_{solution}] \quad (5)$$

Regarding the linear models and associated slope calculation in FIG. 1, it can be appreciated that a change in the mass can result in a change in the system, and the system itself can be nonlinear; thus, the linear model used to determine the next counterbalance may have significant error. Therefore, when applying the Newton Raphson iteration to a process, certain requirements should be followed. First, the initial approximation should be sufficiently accurate to result in subsequent operation near the desired solution and the measurement f(m) being smooth, nearly linear and single-valued in the vicinity of the anticipated operation. Additionally, because higher derivatives of force are neglected in this type of approximation, the higher derivatives should be small so as to avoid convergence problems.

Lastly, in applications of the Newton Raphson iteration, only one solution of mass m should exist for the sensor measurement being equal to zero. This means that there is only one root. Even after following the above requirements, system noise may be a concern. In the hypothetical illustration of FIG. 2, a larger initial test weight, which changes the system to point C, is preferable to the one that changes it to point B. This can be evidenced by comparing the slopes of lines 22, 24 and 26, which result from the various test mass perturbations depicted in FIG. 2. The difference between the before and after test measurement should be large enough to obtain a good approximation of the slope of the function and ensure that the resulting change in the measurement dominates the changes due to system noise.

Figure 3:
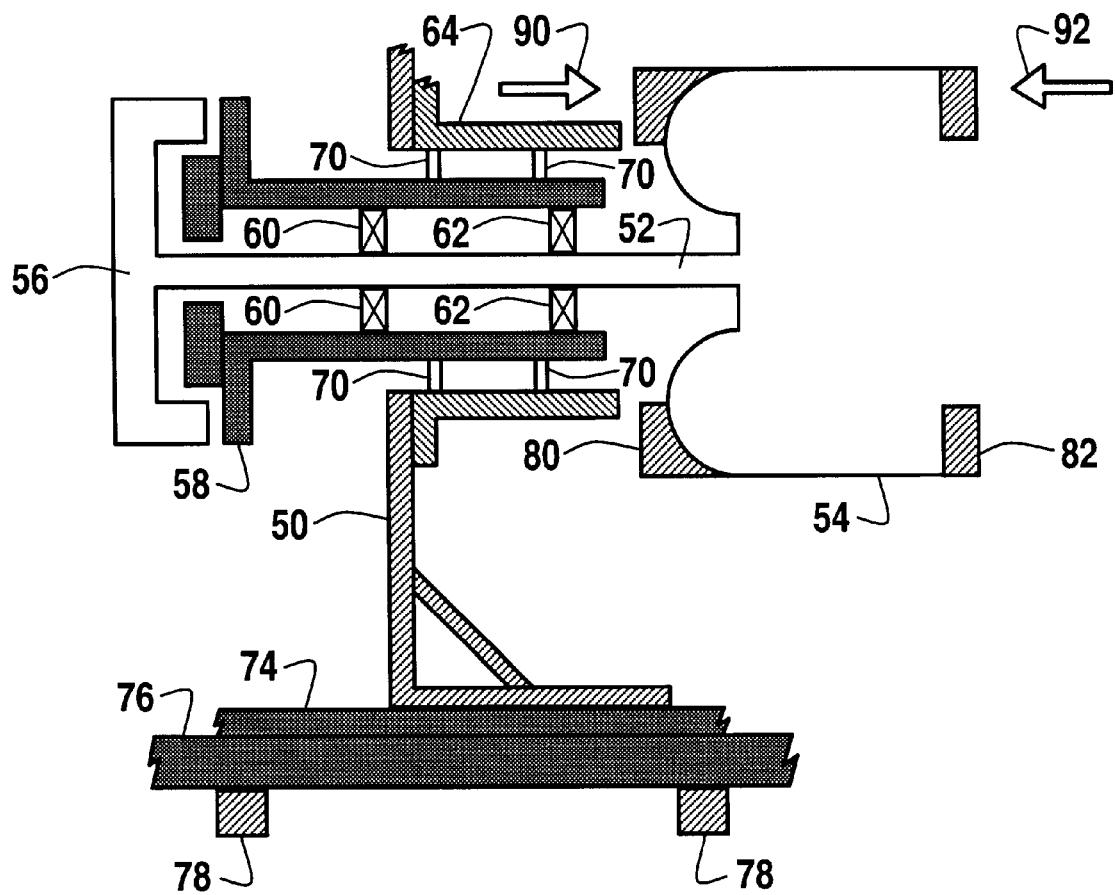
FIG. 3 depicts a schematic representation of a washing machine, which can be adapted for use in association with the present invention.

FIG. 3 depicts a schematic representation of a washing machine used to illustrate the concepts in U.S. Pat. No. 5,561,993, which can be adapted for use in association with the present invention. Those skilled in the art can appreciate that the present invention can be implemented within a rotating device or rotating system, such as, for example, a washing machine. Those skilled in the art can further appreciate, however, that other types of rotatable systems or rotating devices can be utilized in accordance with the present invention. Note that as utilized herein, the terms "rotating system," "rotating device," "rotating apparatus," "rotatable apparatus," "rotatable system," or "rotatable device" may be utilized interchangeably. A washing appliance, such as a washing machine or dishwasher is a type of rotating system or rotating apparatus that can be utilized in accordance with the present invention. Other types of washing appliances, such as circuit board cleaners, may also be utilized in association with the present invention. The basic mechanism of dynamic balancing involves counter balancing the out-of-balance load by injecting, for example, fluid such as water into a plurality of cups placed at front and back axial planes, identified by reference numbers 80 and 82 in FIG. 3, of the rotatable drum.

FIG. 3 thus schematically illustrates a washing machine comprising a frame 50, a shaft 52 and a rotatable drum 54. Shaft 52 can be attached to rotatable drum 54. These two components can be attached to a rotor or pulley 56 of a motor drive. Frame 50 can provide support for a bearing housing 58 in which bearings, 60 and 62, are generally supported. A housing mount 64 can support bearing housing 58. A plurality of sensors identified by the reference numeral 70 is illustrated at locations between housing mount 64 and bearing housing 58 in FIG. 3. These sensors will be described in greater detail below. Beneath frame 50 are generally shown a carpet and pad 74, a support member 76 and a plurality of joists 78. The representation shown in FIG. 3 illustrates a typical application of a horizontal washing machine in a residential housing application. Those skilled in the art can appreciate that FIG. 3 is presented for illustrative purposes only and that a variety of washing machine configurations and other rotating devices, including vertically-oriented washing machines, not illustrated herein can be utilized to implement varying embodiments of the present invention.

With continued reference to FIG. 3, the rotatable drum 54 can be shown having a plurality of schematically illustrated back cups 80 and front cups 82. Both the front and back cups can be disposed at axial ends of the rotatable drum 54 and, although not shown in FIG. 3, both the front and back cups can comprise a plurality of cups dispersed around the periphery of the drum. A quantity of fluid such as water can be injected into the cups from a stationary control valve supplied with water, such as those identified by reference numerals 90 and 92.

Figure 4:
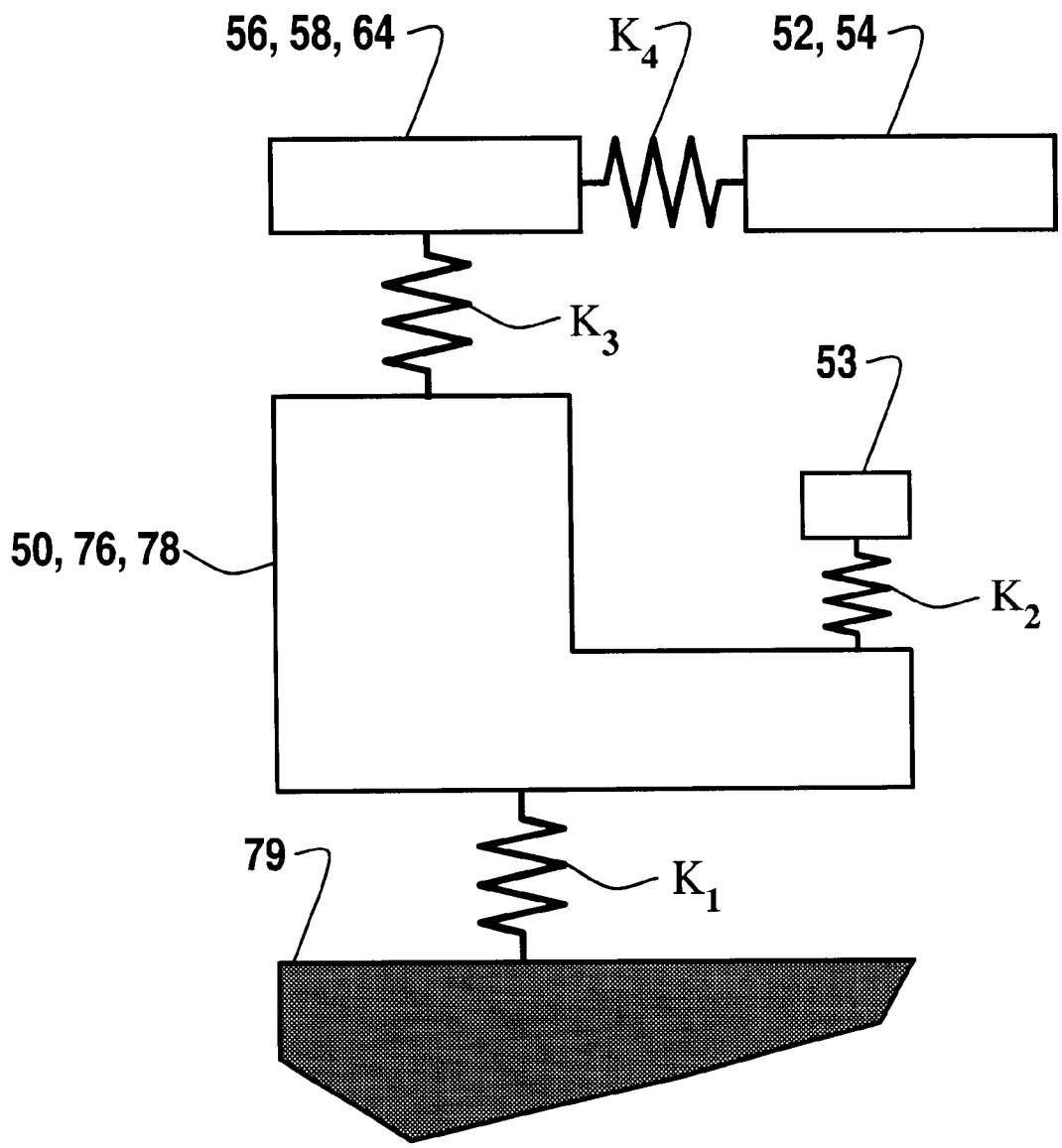
FIG. 4 illustrates a spring and mass illustration depicting the manner in which a nonrigid washing machine can behave if mounted on nonrigid structures.

FIG. 4 illustrates a simplified schematic mass and spring representation of a washing machine such as that shown in FIG. 3. Some balancing systems assume that the machine may be attached rigidly to an immovable object or footing, such as a concrete floor. In most practical residential housing applications, however, the machine is not rigidly attached to an immovable object and, instead, may be associated with a plurality of flexible members. For example, FIG. 4 depicts a schematic representation of a type of arrangement usually encountered in washing machine applications. FIG. 4 thus shows a spring and mass illustration depicting the manner in which a nonrigid washing machine can behave if mounted on nonrigid structures.

The behavior of frame 50 in relation to footing 79 can be described as a spring representing frame 50 and floor 76 and having a spring constant K1. The relationship between a tub 53 (not shown in FIG. 3) surrounding the rotatable drum 54 and frame 50 can be described by a spring constant K2. A spring constant K3 represents the relationship between bearing housing 58 and housing mount 64, and frame 50 in FIG. 3. Lastly, FIG. 4 illustrates a spring constant K4 that represents the bending of shaft 52 along with rotatable members 54 and 56.

Although only represented by boxes in FIG. 4, the schematic illustration depicts a multitude of mass-spring subsystems defining the relationships between major components of the overall system. One purpose for illustrating FIG. 4 is to demonstrate that the relationships between these components are not rigid and, as a result, can permit motion, resulting in accelerations, to occur in response to forces exerted on the various components. Therefore, if the system is not rigid and only forces are measured by the sensors 70 shown in FIG. 3, accurate counterbalance determinations would be extremely difficult, if not impossible, to make.

Figure 2:
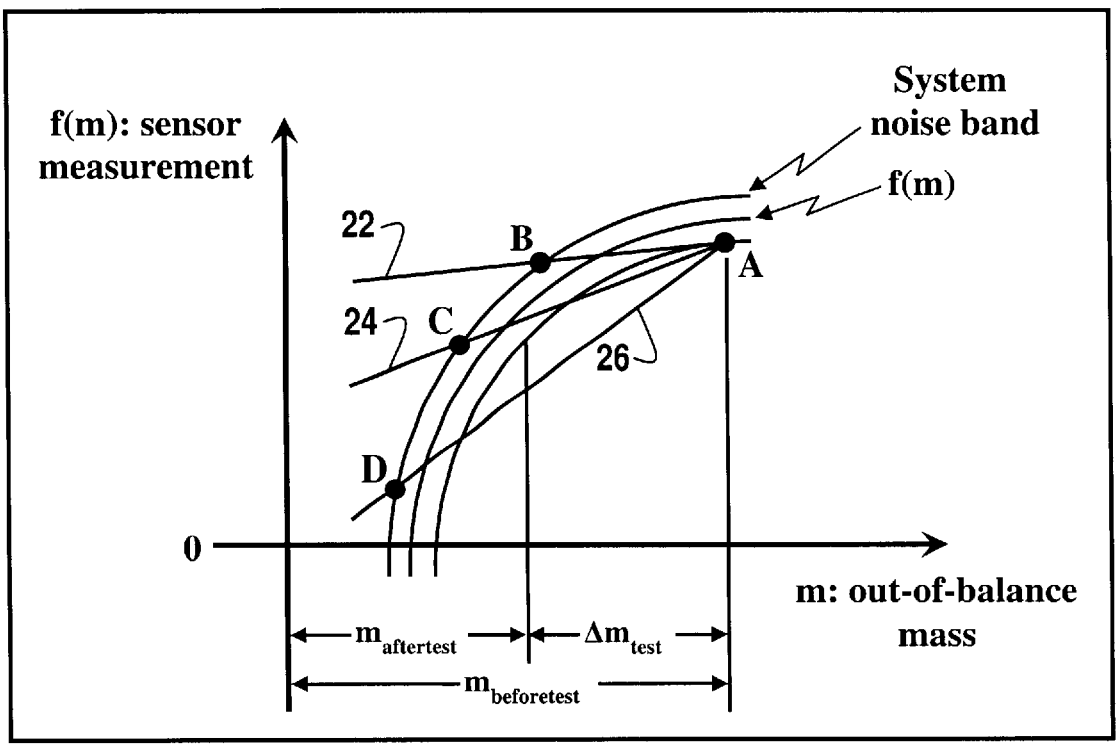
FIG. 2 illustrates a graphical representation of a nonlinear system and the effect of system noise with which the present invention must be concerned.
Figure 5:
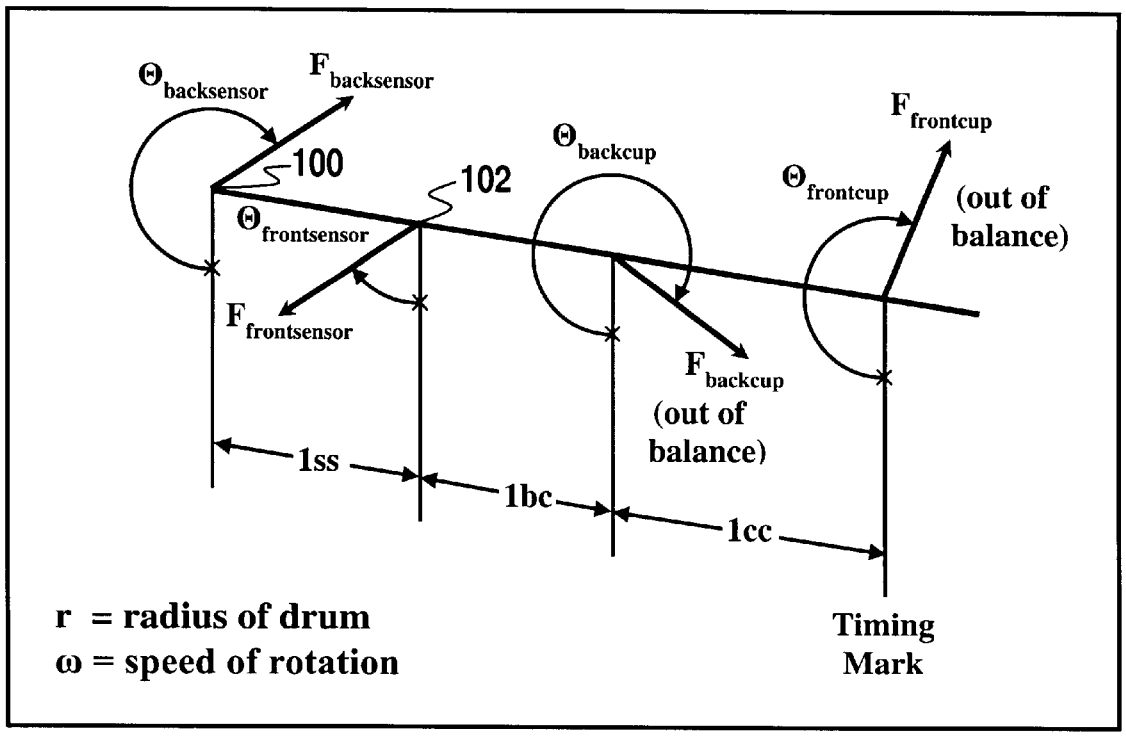
FIG. 5 depicts a three-dimensional schematic representation of the forces and critical lengths along an axis of rotation, which has been extended along a length of the shaft and through a length of the drum.

FIG. 5 illustrates a three-dimensional schematic representation of the forces and critical lengths along the axis of rotation, which has been extended along the length of the shaft and through the length of the drum. Force sensors can be mounted to measure the force transmitted between housing mount 64 and bearing housing 58, as illustrated in FIG. 2. The basic concept of dynamic balancing stipulates that vector forces at the front and back cups may represent an out-of-balance condition. Referring to FIG. 5, the system can be provided with a mechanism for sensing a first force $F_{backsensor}$ at a first location 100 of the axis of rotation and a second mechanism for measuring a second force $F_{frontsensor}$ at a second location 102 of the axis of rotation. It should be understood that both the first and second forces shown in FIG. 5 are likely to be determined from a plurality of force sensors arranged so that the resultant force vectors along multiple axes of the system can be determined at each of the first and second locations, 100 and 102, of the axis of rotation.

If a washing machine or any similar apparatus with a rotating member is rigidly attached to an unmovable object, such as a concrete floor, in such a way that movement of the machine was prevented, a mere force and moment analysis based on forces and moment arms shown in FIG. 5 would be appropriate and could yield sufficient information to allow the counterbalance forces to be implemented in a manner that would achieve a balance of a rotating drum 54. As discussed above, however, in conjunction with FIGS. 3 and 4, it is not practical to expect a machine of this type to be installed and operate without motion being experienced by the various portions of the machine. Therefore, it may be beneficial to measure motion relative to a footing or inertial space (e.g., acceleration) and account for it in the analysis of forces.

Figure 6:
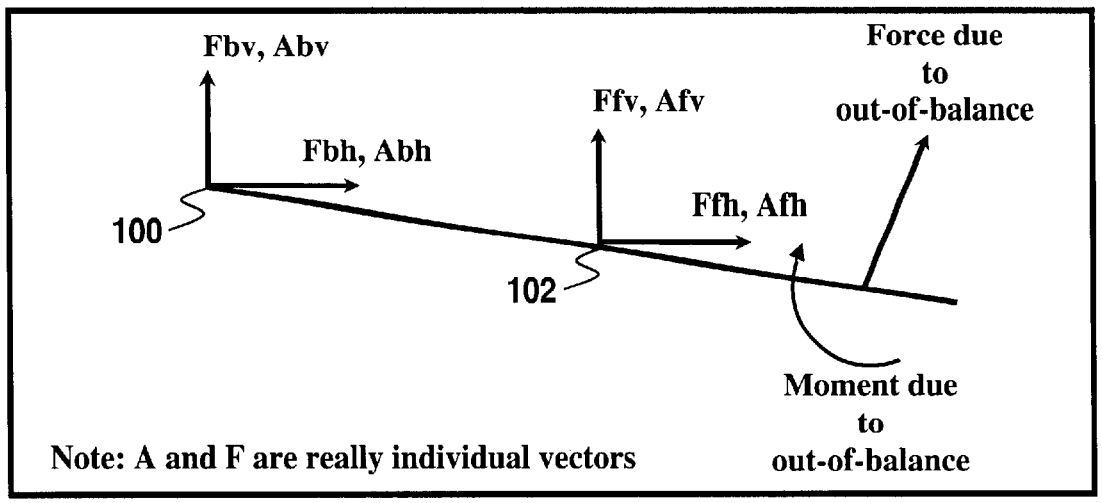
FIGS. 6 and 7 depict a graphical representation of a shaft with measured force and motion parameters.
Figure 7:
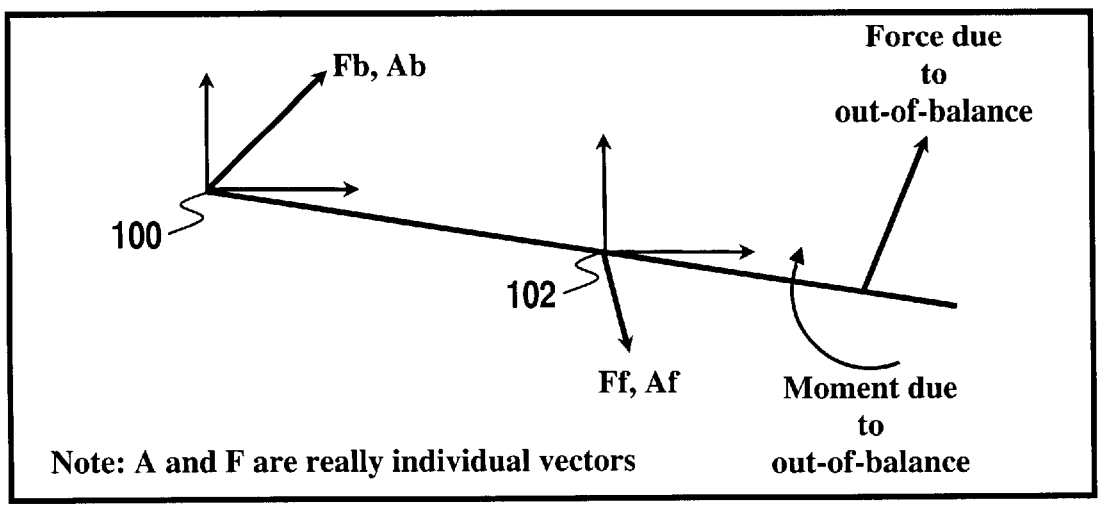

FIGS. 6 and 7 show the measurement of forces and accelerations in three-dimensional space at various locations along the shaft 52. Viewing FIGS. 6 and 7 together, it can be seen that the forces and accelerations can be measured at two coincident locations on the shaft 52. It can be appreciated, however, that this coincidence of the first force and the first acceleration or the second force and the second acceleration are not requirements of the present invention. At each of the first and second locations, 100 and 102, the effects of rotating out-of-balance forces are determined along the horizontal (h) and vertical (v) coordinates. It can be appreciated by those skilled in the art that the coordinates illustrated in FIGS. 6 and 7 represent the fact that the concepts in U.S. Pat. No. 5,561,993 and the present invention operate with information describing the forces in terms of a magnitude, a fixed direction and an associated rotating drum angle. Similarly, the motion (e.g., accelerations) may also be expressed as a magnitude along a fixed direction with an associated rotating drum angle.

TABLE 1

| VARIABLE | MEANING |
|---|---|
| Inputs | |
| $\Delta m_{front\_cb}$ | Test counterbalance mass placed in the front plane (vector) |
| $\Delta m_{back\_cb}$ | Test counterbalance mass placed in the back plane (vector) |
| $\omega_{back}$ | Speed of rotation in (rad/sec) at which the back plane test counterbalance occurred |
| $\omega_{front}$ | Speed of rotation in (rad/sec) at which the front plane test counterbalance occurred |
| R | Radius of counterbalance placement (inches) |
| $\omega$ | Current speed of rotation |

TABLE 1-continued

| VARIABLE | MEANING |
|---|---|
| Outputs | |
| $f_{back}$ | Back force sensor (lbf) (vector) |
| $f_{front}$ | Front force sensor (lbf) (vector) |
| $a_{back}$ | Back accelerometer sensor (in/sec$^2$) (vector) |
| $a_{front}$ | Front accelerometer sensor (in/sec$^2$) (vector) |
| Actions | |
| $m_{backplane\_cb}$ | Estimated backplane counterbalance to drive sensor readings to zero (vector) |
| $m_{frontplane\_cb}$ | Estimated frontplane counterbalance to drive sensor readings to zero vector |

For the following discussion, Table I illustrates the inputs and outputs used in the multi-input/multi-output condition relating to the invention discussed U.S. Pat. No. 5,561,993. In order to find the appropriate solutions for the counterbalance forces described above in conjunction with FIGS. 5, 6, and 7, the measured forces and accelerations should be considered in the balancing of the system forces and moments. As described above, the counterbalance masses, forces and accelerations represent magnitudes and angles. Therefore, all variables shown in Table I, except r and ω generally comprise both a magnitude and an angle in polar coordinates, which can be converted to complex coordinates. The relationship described in equation 5 above can be rewritten for the multi-input/multi-output case to result in four coupled simultaneous equations, incorporating the effects of perturbations in both front and back planes that could have occurred at rotational speeds slightly different from the current speed. These four relationships are shown below and are identified as equation 6.

$$a_{back4} = -\left(\frac{a_{back1} - a_{back0}}{r \cdot \omega_{back}^2 \cdot \Delta m_{back\_cb}}\right) \cdot r \cdot \omega^2 \cdot m_{backplane\_cb} - \left(\frac{a_{back3} - a_{back2}}{r \cdot \omega_{front}^2 \cdot \Delta m_{front\_cb}}\right) \cdot r \cdot \omega^2 \cdot m_{frontplane\_cb}$$

$$a_{front4} = -\left(\frac{a_{front1} - a_{front0}}{r \cdot \omega_{back}^2 \cdot \Delta m_{back\_cb}}\right) \cdot r \cdot \omega^2 \cdot m_{backplane\_cb} - \left(\frac{a_{front3} - a_{front2}}{r \cdot \omega_{front}^2 \cdot \Delta m_{front\_cb}}\right) \cdot r \cdot \omega^2 \cdot m_{frontplane\_cb}$$

$$f_{back4} = -\left(\frac{f_{back1} - f_{back0}}{r \cdot \omega_{back}^2 \cdot \Delta m_{back\_cb}}\right) \cdot r \cdot \omega^2 \cdot m_{backplane\_cb} - \left(\frac{f_{back3} - f_{back2}}{r \cdot \omega_{front}^2 \cdot \Delta m_{front\_cb}}\right) \cdot r \cdot \omega^2 \cdot m_{frontplane\_cb}$$

$$f_{front4} = -\left(\frac{f_{front1} - f_{front0}}{r \cdot \omega_{back}^2 \cdot \Delta m_{back\_cb}}\right) \cdot r \cdot \omega^2 \cdot m_{backplane\_cb} - \left(\frac{f_{front3} - f_{front2}}{r \cdot \omega_{front}^2 \cdot \Delta m_{front\_cb}}\right) \cdot r \cdot \omega^2 \cdot m_{frontplane\_cb}$$

The four relationships are generally grouped together as a single equation since they can be treated as a matrix in the following discussion. The meanings of the subscripts in equation 6 above are identified in Table II.

TABLE II

| SUBSCRIPT | MEANING |
|---|---|
| 0 | Measurement prior to backplane counter-balance test mass $\Delta m_{back\_cb}$ |
| 1 | measurement after backplane counter_balance test mass $\Delta m_{back\_cb}$ |
| 2 | measurement prior to frontplane counterbalance test mass $\Delta m_{front\_cb}$ |
| 3 | measurement after frontplane counterbalance test mass $\Delta m_{front\_cb}$ |
| 4 | current sensor measurement |

The relationships shown above in equation 6 can be applied to equation 5 in matrix form as:

$$\begin{bmatrix} a_{back4} \\ a_{front4} \\ f_{back4} \\ f_{front4} \end{bmatrix} = -\begin{bmatrix} \frac{a_{back1} - a_{back0}}{r \cdot \omega_{back}^2 \Delta m_{back\_cb}} & \frac{a_{back3} - a_{back2}}{r \cdot \omega_{front}^2 \Delta m_{front\_cb}} \\ \frac{a_{front1} - a_{front0}}{r \cdot \omega_{back}^2 \Delta m_{back\_cb}} & \frac{a_{front3} - a_{front2}}{r \cdot \omega_{front}^2 \Delta m_{front\_cb}} \\ \frac{f_{back1} - f_{back0}}{r \cdot \omega_{back}^2 \Delta m_{back\_cb}} & \frac{f_{back3} - f_{back2}}{r \cdot \omega_{front}^2 \Delta m_{front\_cb}} \\ \frac{f_{front1} - f_{front0}}{r \cdot \omega_{back}^2 \Delta m_{back\_cb}} & \frac{f_{front3} - f_{front2}}{r \cdot \omega_{front}^2 \Delta m_{front\_cb}} \end{bmatrix} \cdot \begin{bmatrix} m_{backplane\_cb} \\ m_{frontplane\_cb} \end{bmatrix} \cdot r \cdot \omega^2 \quad (7)$$

where we describe this matrix equation as being in the form b=Ax and $$A = -\frac{\partial f(m)}{\partial m} = -\begin{bmatrix} \frac{a_{back1} - a_{back0}}{r \cdot \omega_{back}^2 \cdot \Delta m_{back\_cb}} & \frac{a_{back3} - a_{back2}}{r \cdot \omega_{front}^2 \cdot \Delta m_{front\_cb}} \\ \frac{a_{front1} - a_{front0}}{r \cdot \omega_{back}^2 \cdot \Delta m_{back\_cb}} & \frac{a_{front3} - a_{front2}}{r \cdot \omega_{front}^2 \cdot \Delta m_{front\_cb}} \\ \frac{f_{back1} - f_{back0}}{r \cdot \omega_{back}^2 \cdot \Delta m_{back\_cb}} & \frac{f_{back3} - f_{back2}}{r \cdot \omega_{front}^2 \cdot \Delta m_{front\_cb}} \\ \frac{f_{front1} - f_{front0}}{r \cdot \omega_{back}^2 \cdot \Delta m_{back\_cb}} & \frac{f_{front3} - f_{front2}}{r \cdot \omega_{front}^2 \cdot \Delta m_{front\_cb}} \end{bmatrix} \quad (8)$$

Equations 6, 7 and 8 depict the mathematical model that was developed and described in U.S. Pat. No. 5,561,993. This mathematical model is formulated such that the dynamics of the system are divided into two columns based on whether mass is placed in the front plane (i.e., column 2) or the back plane (i.e., column 1) of the spinner. The present invention disclosed herein demonstrates how this control model can be extended to allow for the placement of mass in both the front and the back plane simultaneously. This formulation is a more general solution to the equations disclosed in U.S. Pat. No. 5,561,993, and also covers the case where more than two inputs to the system are utilized. The additional input planes create more than two columns in the A matrix that represents the dynamic model of the system. Additionally, the present invention covers the case where simultaneous control actions on the extreme concentric planes of the spinning member (i.e., spinner) can be utilized to effect apparent control actions on a single concentric plane located between the two extremes. In this manner, single or multiple control planes can be enabled and accounted for by the appropriate number of columns in the A matrix that represents the dynamic model of the system.

In order to develop the basic principles of Newton's method to solve the balancing problem for concurrent control actions or simultaneous test injections, we will make the following assumptions. First, it must be assumed that the vector [f(m)] represents n complex sensor readings. Second, an assumption must be made that the vector $[\Delta m]=[m_{after}-m_{before}]$ describes an m dimensional complex vector of the mass counterbalances applied to predetermined locations of the rotating apparatus or system to be balanced. In this case n generally defines the number of sensors that can be utilized to construct the control model. The variable m, on the other hand is generally assumed to represent the number of locations in which counterbalance can be applied to the rotating apparatus or system requiring balancing.

For the simple case where the fluid mass is placed in only the back and front planes of the spinner, the variables with the subscript i represent the initial conditions of the system, as indicated by equations 9, 10, and 11 below:

$$m(i) = \begin{bmatrix} m_{back}(i) \\ m_{front}(i) \end{bmatrix} \in C^2 \quad (9)$$

$$k(i) = \|m(i+1) - m(i)\| \quad (10)$$

$$f(i) = f(m(i)) \in C^n \quad (11)$$

Figure 8:
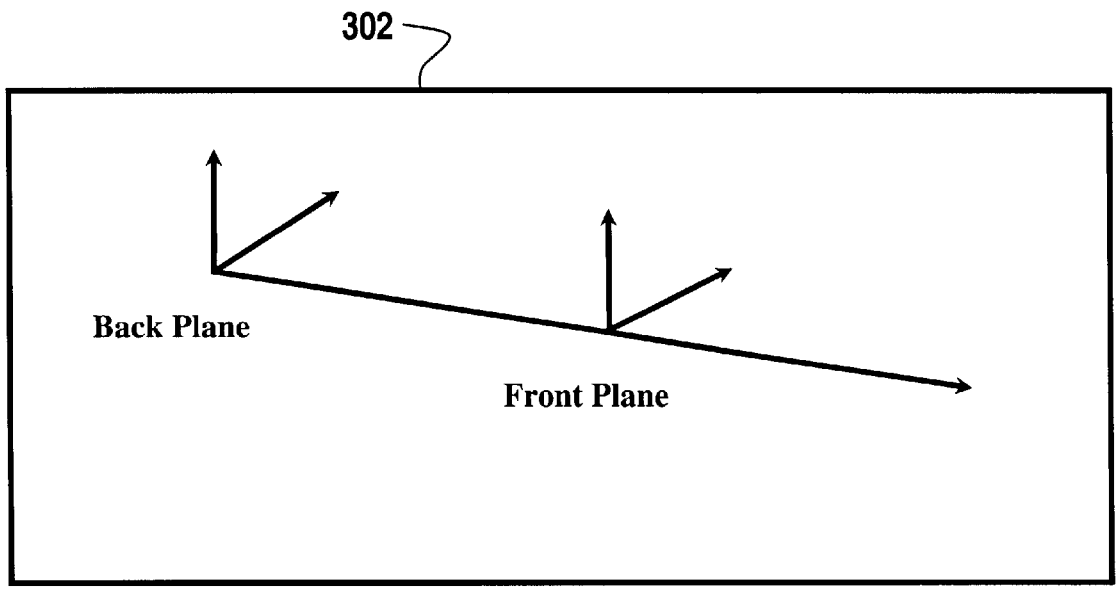
FIG. 8 illustrates the relationship between force vectors in a back plane and front plane, in accordance with preferred embodiments of the present invention.

As indicated in equations 9, 10, and 11 above, m(i) can be a complex vector representing the force at the front and back planes of the spinner, in $Ib_f$, as indicated in FIG. 8. FIG. 8 illustrates the relationship between force vectors in a back plane and front plane, in accordance with preferred embodiments of the present invention. This graphical relationship illustrated in graph 302 of FIG. 8.

Figure 9:
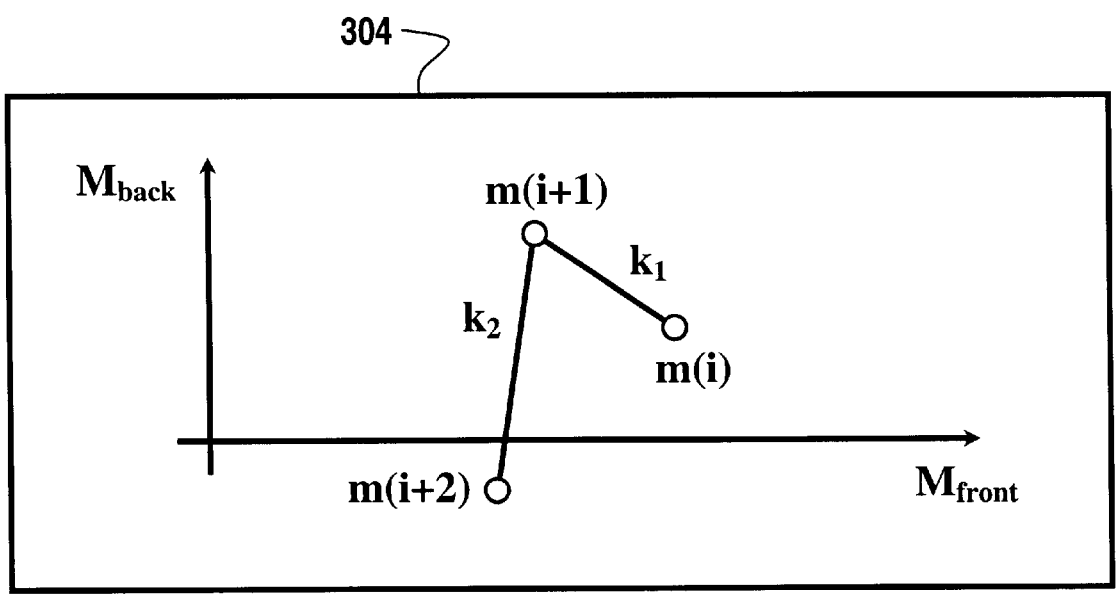
FIG. 9 depicts a graph illustrating the relationship of m space to k space, in accordance with preferred embodiments of the present invention.

The equation $\Delta m(i+1)=m(i+1)-m(i)$ represents a complex vector of counter balances applied to the spinner (also in $Ib_f$). The variable k represents the length vector of $\Delta m(i)$. The variable n can be equivalent to the number of sensors. Additionally, f(i) represents a complex vector of sensor measurements at the condition corresponding to each m(i). The relationship between m(i) and k is depicted in FIG. 9. FIG. 9, therefore, illustrates a graph 304 depicting the relationship between m space and k space, in accordance with preferred embodiments of the present invention.

Thus, a model must be configured such that the states of the system can be identified by sensor measurements f(m), and the inputs to the system are represented as counterbalance vectors $\Delta m$ applied to the spinner. From the development of the Newton Raphson iteration method described in equation 5, the system can be rewritten in matrix form as in equation 12 below.

$$\vec{f}(m_{aftertest}) = -\left[\frac{\partial f(m)}{\partial m}\right] \cdot (\vec{m}_{next} - \vec{m}_{aftertest}) = -\left[\frac{\partial f(m)}{\partial m}\right] \Delta \vec{m} \quad (12)$$

This equation is in the form of equation 13:

$$\vec{b} = [A]\vec{x} \text{ where } [A] = -\left[\frac{\partial f(m)}{\partial m}\right] \quad (13)$$

In the case of the system with 2 inputs (i.e. $m_{back}$ and $m_{front}$), the A matrix described in equation 13 can be represented by the complex matrix in equation 14.

$$[A] = -\left[\frac{df}{dm_{back}} \quad \frac{df}{dm_{front}}\right] \quad (14)$$

Additionally, equation 15 below represents a complex column vector of counterbalances (input). This equation can be extended to any m×1 column vector of counterbalances, where m represents the number of locations that counterbalances are applied.

$$\vec{x} = [\Delta m] = \begin{bmatrix} \Delta m_{back} \\ \Delta m_{front} \end{bmatrix} \quad (15)$$

Equation 16 represents the complex n by 1 column vector of the sensor readings (output):

$$\vec{b} = [f(m_{aftertest})] \quad (16)$$

In order to implement a system with simultaneous front and back injections, while maintaining the front and back planes (i.e., m number of planes) as the independent inputs, the A matrix must be formed based on two (i.e., or the m number of input planes) consecutive test injections, rather than on the separate contributions of the front and back plane injections. Additionally, the present invention covers the case where simultaneous control actions on the extreme concentric planes of the spinning member (i.e., spinner) can be utilized to effect apparent control actions on a single concentric plane that is between the two extremes. In this manner, single or multiple control planes can be enabled and accounted for by the appropriate number of columns in the A matrix that represents the dynamic model of the system.

This matrix is generally created based on the relationship between the mass input and the sensor measurements based on two (or m) independent perturbations of the system. A second matrix is then required to map this matrix back into the planes of the two (or m or less) counterbalance inputs (in the forgoing example this would be the front and back cups).

Equations 17 and 18 below show the simultaneous injection equations for the case of two inputs and 4 sensor readings that is illustrated in equation 8.

$$\frac{\partial f}{\partial m} = \frac{\partial f}{\partial k} \frac{\partial k}{\partial m} \quad (17)$$

$$\frac{df}{dm} = A = -\begin{bmatrix} \frac{a_{back1} - a_{back0}}{\|\Delta m(1)_{cb}\|} & \frac{a_{back2} - a_{back1}}{\|\Delta m(2)_{cb}\|} \\ \frac{a_{front1} - a_{front0}}{\|\Delta m(1)_{cb}\|} & \frac{a_{front2} - a_{front1}}{\|\Delta m(2)_{cb}\|} \\ \frac{f_{front1} - f_{front0}}{\|\Delta m(1)_{cb}\|} & \frac{f_{front2} - f_{front1}}{\|\Delta m(2)_{cb}\|} \\ \frac{f_{back1} - f_{back0}}{\|\Delta m(1)_{cb}\|} & \frac{f_{back1} - f_{front1}}{\|\Delta m(2)_{cb}\|} \end{bmatrix} \cdot$$

$$\begin{bmatrix} \frac{\Delta m(1)_{back\_cb}}{\|\Delta m(1)_{cb}\|} & \frac{\Delta m(1)_{back\_cb}}{\|\Delta m(2)_{cb}\|} \\ \frac{\Delta m(1)_{front\_cb}}{\|\Delta m(1)_{cb}\|} & \frac{\Delta m(1)_{front\_cb}}{\|\Delta m(2)_{cb}\|} \end{bmatrix}^{-1} \quad (18)$$

Note that in equations 17, 18 above, df/dk represents the change in sensors from each test with respect to the magnitude of the length vector of the mass placement for each test (k). This operation maps the sensor measurements into the plane of the combined mass placement magnitude space (i.e., the simultaneous injection space). The relationship is fully described in equation 19.

$$\frac{\partial f}{\partial k} = \left[ \frac{f(i+1) - f(i)}{\|m(i+1) - m(i)\|} \quad \frac{f(i+2) - f(i+1)}{\|m(i+2) - m(i+1)\|} \right] = \quad (19)$$

$$\left[ \frac{\operatorname{Re}(f(i+1) - f(i))_{sensor[i]} + \sqrt{-1} \cdot \operatorname{Im}(f(i+1) - f(i))_{sensor[i]}}{\left\| \begin{bmatrix} \operatorname{Re}(m(i+1) - m(i))_{back} + \sqrt{-1} \cdot \operatorname{Im}(m(i+1) - m(i))_{back} \\ \operatorname{Re}(m(i+1) - m(i))_{front} + \sqrt{-1} \cdot \operatorname{Im}(m(i+1) - m(i))_{front} \end{bmatrix} \right\|} \right.$$

$$\left. \frac{\operatorname{Re}(f(i+2) - f(i+1))_{sensor[i]} + \sqrt{-1} \cdot \operatorname{Im}(f(i+2) - f(i+1))_{sensor[i]}}{\left\| \begin{bmatrix} \operatorname{Re}(m(i+2) - m(i+1))_{back} + \sqrt{-1} \cdot \operatorname{Im}(m(i+2) - m(i+1))_{back} \\ \operatorname{Re}(m(i+2) - m(i+1))_{front} + \sqrt{-1} \cdot \operatorname{Im}(m(i+2) - m(i+1))_{front} \end{bmatrix} \right\|} \right]$$

In equation 20 below, dk/dm represents the inverse of the front and back component vector of each mass placement with respect to the absolute magnitude of the mass placement length vector, (k), for each test. This matrix maps df/dk from the plane of the combined mass placement $$\frac{\partial k}{\partial m} = \left( \frac{\partial m}{\partial k} \right)^{-1} \quad (20)$$

$$\frac{\partial k}{\partial m} = \left[ \frac{m(i+1) - m(i)}{\|m(i+1) - m(i)\|} \quad \left( \frac{m(i+2) - m(i+1)}{\|m(i+2) - m(i+1)\|} \right)^{-1} \right]$$

$$= \left[ \begin{array}{cc} \frac{(m(i+1) - m(i))_{back}}{\|m(i+1) - m(i)\|} & \frac{(m(i+2) - m(i+1))_{back}}{\|m(i+1) - m(i+1)\|} \\ \frac{(m(i+1) - m(i))_{front}}{\|m(i+1) - m(i)\|} & \frac{(m(i+2) - m(i+1))_{front}}{\|m(i+2) - m(i+1)\|} \end{array} \right]^{-1}$$

magnitude back into the front and back planes.

Equations 5 and 12 can thus be rewritten as equation 21 below:

$$f(i+2) = -\left[ \frac{f(i+1) - f(i)}{\|m(i+1) - m(i)\|} \quad \frac{f(i+2) - f(i+1)}{\|m(i+2) - m(i+1)\|} \right] \quad (21)$$

$$\left[ \frac{m(i+1) - m(i)}{\|m(i+1) - m(i)\|} \quad \frac{m(i+2) - m(i+1)}{\|m(i+2) - m(i+1)\|} \right]^{-1} \left[ \begin{array}{c} \Delta m_{back} \\ \Delta m_{front} \end{array} \right]$$

where $$\left[ \begin{array}{c} \Delta m_{back} \\ \Delta m_{front} \end{array} \right]$$

is equivalent to the required counter balance in the back and front planes (i.e., input vector). Note that in equation 21 above, it can be appreciated how easily the equation can be extended for multiple mass placement and test parameters.

When test 1 represents an injection in the back and test 2 represents an injection in the front, the dk/dm matrix becomes:

$$\left( \frac{\partial m}{\partial k} \right)^{-1} = \left[ \begin{array}{cc} \frac{\Delta m_{back}}{\|\Delta m_{test1}\|} & \frac{0}{\|\Delta m_{test2}\|} \\ \frac{0}{\|\Delta m_{test1}\|} & \frac{\Delta m_{frontk}}{\|\Delta m_{test2}\|} \end{array} \right]^{-1}$$

Here the diagonal elements reduce to the angle portion of the injections and the off diagonals are zero. Then, evaluating from equation 21 reduces to the original formulation of the A matrix described in U.S. Pat. No. 5,561,993.

$$\left( \frac{\partial f}{\partial m} \right) = \left( \frac{\partial f}{\partial k} \right) \cdot \left( \frac{\partial m}{\partial k} \right)^{-1}$$

The formulation of the A matrix based on two simultaneous test injections requires that a determination be made whether the angle between the two test vectors is far enough apart for the A matrix to be a good model of the system dynamics. Such a determination may be referred to as a difference check. To achieve a good model of the system requiring balancing, test masses are required, which are sufficiently different or independent from one another other to excite the system in different or independent directions, including non-parallel or orthogonal directions.

For example, if the cross section of the machine is divided into an x-y grid, sequential test masses on the back plane in the x direction are parallel. This is based on the fact that difference or independence can be defined with respect to the front and back axial planes of the rotatable apparatus, as well as in the two dimensional complex vector space. If two injections are parallel according to this definition, the resultant A matrix may not have any information about the front plane or the y direction. The desired mass placement information computed from the algorithm to balance the system may be completely wrong, because the A matrix representing the system describes only one plane and one direction.

A matrix should generally describe the response of the rotating system as best possible. Thus, an independence or rank criterion can be used for the difference check and utilized to determine whether each consecutive control action is different enough from the previous to form a model that is sufficiently representative of the dynamics of the rotating system. Where the A matrix is created from two control actions, a complex vector angle can be determined between the two test vectors and used as the independence or rank criterion. Where the two test vectors are in response to simultaneously placing mass at predetermined locations within the rotating system in order to determine, a required correction may be necessary to place the rotating system in a balanced state.

In the case of the system described herein, two inputs can be provided and independently manipulated. When a simultaneous injection is desired, the combined results of the two inputs should be considered for each test. This result may be subsequently utilized to form each new column of the A matrix. In mapping the simultaneous injections back into the separate front and back planes, the following matrix can be utilized:

$$\left(\frac{\partial m}{\partial k}\right)^{-1}$$

This matrix, therefore, represents two columns of unit vectors representative of the relative strength of the front and back contributions of each test mass.

Filling in the factor m(i), this matrix becomes:

$$\begin{bmatrix} \frac{\partial m_{back}(i+1)}{\partial k(i+1)} & \frac{\partial m_{back}(i+2)}{\partial k(i+2)} \\ \frac{\partial m_{front}(i+1)}{\partial k(i+1)} & \frac{\partial m_{front}(i+2)}{\partial k(i+2)} \end{bmatrix} = \quad (22)$$

$$\begin{bmatrix} \frac{\Delta m_{back}(i+1)}{\|\Delta m_{back}(i+1)+\Delta m_{front}(i+1)\|} & \frac{\Delta m_{back}(i+2)}{\|\Delta m_{back}(i+2)+\Delta m_{front}(i+2)\|} \\ \frac{\Delta m_{front}(i+1)}{\|\Delta m_{back}(i+1)+\Delta m_{front}(i+1)\|} & \frac{\Delta m_{front}(i+2)}{\|\Delta m_{back}(i+2)+\Delta m_{front}(i+2)\|} \end{bmatrix}$$

The matrix can be normalized with respect to the absolute magnitude of each mass placement test.

The difference between the two test masses with respect to the back and front plane can be found utilizing the determinant (i.e., a complex scalar number) of the matrix in equation 22. The norm of this scalar complex number is an indication of the difference or degree of independence of the two test masses with respect to the back and front plane. If the magnitude of the determinant is close to 1, then the two test masses can be independent with respect to the back and front planes. This relationship can be proved by first realizing that the matrix of equation 22 represents a matrix of two normalized vectors, $\vec{a}$ and $\vec{b}$, as described by the vectors in equation 23.

$$[\vec{a}\ \vec{b}] = \quad (23)$$

$$\begin{bmatrix} \frac{\Delta m_{back}(i+1)}{\|\Delta m_{back}(i+1)+\Delta m_{front}(i+1)\|} & \frac{\Delta m_{back}(i+2)}{\|\Delta m_{back}(i+2)+\Delta m_{front}(i+2)\|} \\ \frac{\Delta m_{front}(i+1)}{\|\Delta m_{back}(i+1)+\Delta m_{front}(i+1)\|} & \frac{\Delta m_{front}(i+2)}{\|\Delta m_{back}(i+2)+\Delta m_{front}(i+2)\|} \end{bmatrix}$$

In equation 23 $\vec{a}$ and $\vec{b}$ are complex vectors that follow the relationship ($\vec{a}^* \cdot \vec{a} = \vec{b}^* \cdot \vec{b} = 1$) and $\vec{a}^*$ is the complex conjugate of $\vec{a}$.

$$\vec{a}^* \cdot \vec{b} = \sum_j \vec{a}_j^* \cdot \vec{b}_j \text{ and } \|\vec{a}\| = \sqrt{\sum_j (\text{Re}(\vec{a}_j))^2 + (\text{Im}(\vec{a}_j))^2}$$

Because vectors $\vec{a}$ and $\vec{b}$ are normalized in general. The following holds true:

$$0 \leq \|\vec{a}^* \cdot \vec{b}\| \leq 1 \text{ (note } \vec{a} \text{ and } \vec{b} \in C^2\text{)}$$

In this case, $C^2$ is the two-dimensional complex vector space defined by the front and back mass placement planes. This implies the following:

if $\|\vec{a}^* \cdot \vec{b}\|=1$, then $\vec{a}$ and $\vec{b}$ will be in the same direction in $C^2$, Similarly, the following holds true:

if $\|\vec{a}^* \cdot \vec{b}\|=0$, then $\vec{a}$ and $\vec{b}$ are orthogonal in $C^2$.

To check for sufficient difference between test vectors $\vec{a}$ and $\vec{b}$, it must be made certain that the following conditions occur:

$\|\vec{a}^* \cdot \vec{b}\| \leq \epsilon$, (the appropriate size of $\epsilon$ is determined experimentally)

Additionally, the mathematical representation of equation 24 implies that the difference or independence measure condition becomes that indicated by equation 25 below:

$$det[\vec{a}\ \vec{b}]=1-\|\vec{a}^* \cdot \vec{b}\|^2 \quad (24)$$

$$\sqrt{1-\epsilon^2} < det[\vec{a}\ \vec{b}] \leq 1 \quad (25)$$

For example, if the majority of the test mass from the first simultaneous injection ends up in the front plane and the majority of test mass from the second simultaneous injection goes into the back plane, the following condition can then occur, as indicated by equation 26 below, wherein the magnitude of the determinant evaluates to a number close to 1:

$$\left\| \left(\frac{\Delta m_{back}(i+1)}{\|\Delta m(i+1)\|}\right) * \left(\frac{\Delta m_{front}(i+2)}{\|\Delta m(i+2)\|}\right) \right\| \quad (26)$$

$$<< \left\| \left(\frac{\Delta m_{front}(i+1)}{\|\Delta m(i+1)\|}\right) * \left(\frac{\Delta m_{back}(i+2)}{\|\Delta m(i+2)\|}\right) \right\|$$

Finally, as indicated by equation 27 below, the following conditions occur:

$$\left\| \left(\frac{\Delta m_{back}(i+1)}{\|\Delta m(i+1)\|}\right) * \left(\frac{\Delta m_{front}(i+2)}{\|\Delta m(i+2)\|}\right) - \right. \quad (27)$$

$$\left. \left(\frac{\Delta m_{front}(i+1)}{\|\Delta m(i+1)\|}\right) * \left(\frac{\Delta m_{back}(i+2)}{\|\Delta m(i+2)\|}\right) \right\| = \sqrt{1-\varepsilon^2}, \varepsilon \approx 0$$

Those skilled in the art can appreciate that for the opposite case, other parameters may hold true. For example, when the majority of the test mass from the first simultaneous injection ends up in the front plane and the majority of the test mass from the second simultaneous injection goes into the front plane, the "less than" sign in the equation can be reversed. For both these cases, a large difference value (<<<) indicates that the two tests are sufficiently different from one another to form a new control model.

The equation relationships shown in equation 21 can be rewritten in matrix format to solve for the counterbalance masses, $\Delta m_{back}$ and $\Delta m_{front}$, required to bring the system into balance the same way as in U.S. Pat. No. 5,561,993. For the case of four sensors and using the A matrix of equation 18, this can be expressed through equation 28 as:

$$\begin{bmatrix} \Delta m_{back} \\ \Delta m_{front} \end{bmatrix} = A^+ \cdot \begin{bmatrix} a_{back} \\ a_{front} \\ f_{back} \\ f_{front} \end{bmatrix} \quad (28)$$

In a situation, such as that described by equation 28 above, two accelerations and two forces are known from measurements while two counterbalanced forces are generally unknown (i.e., there are more equations than unknowns). Each sensor provides an equation, while there are only two unknown counterbalance forces for the front and back planes of the drum. Therefore, the system is over-determined and a technique is required to solve for more equations than unknowns in an optimal manner. The technique for solving equations of this type in a balancing scheme should find a solution that minimizes all of the sensor readings and also minimizes the amount of counterbalance action required to balance the rotating system or rotating device. In other words, the force sensors and the accelerometers should all be driven as close to zero as possible by the, selected counterbalances and the total amount of counterbalance actions taken should be minimized.

Those skilled in the art can appreciate that a mathematical technique, which may solve this problem, involves computing the pseudo inverse of the A matrix ($A^+$) using the singular value decomposition (SVD). This solution. method finds the optimal solution to the inconsistent system represented simply by equation 29. This procedure is fully described in U.S. Pat. No. 5,561,993 and is summarized here for illustrative purposes only. In equation 29, shown below, A may be a matrix, and x and b may be vectors.

$$Ax=b \tag{29}$$

The SVD technique finds the pseudo-inverse of a non-square matrix A. The SVD method is generally a robust technique and finds the optimal solution for x in equation 29 in a manner similar to a least squares technique, also well known by those skilled in the art. Once the pseudo-inverse is found using the SVD method, equation 21 can be solved for the counterbalance. masses, $\Delta m_{back}$ and $\Delta m_{front}$. Because $A^{-1}$ may be a pseudo-inverse, no exact solution can exist for solving equation 29 and the optimal approximate solution in a least squares sense requires that the left side of equation 29 equals the perpendicular projection of the right side of equation 29 onto the range of A (i.e., a subspace of b that can be reached by linear combinations of the columns of A). SVD combined with a technique of zeroing small singular values (e.g., described below) accomplishes this optimization, including the minimization of the solution x.

Throughout the description of the control system, repeated reference may be made to the SVD. This procedure can be performed, for example, through the use of a library software program suitable for performing the SVD computation described above. The SVD method is one of several techniques that can support the pseudo-inverse calculation for control. It can provide optimal control for both inputs and outputs of the modeled system. Other variations of the components that make up the SVD can be used alone, but would not provide both input and output optimization.

The singular value decomposition may be realized by a method in which A is factored into the elements shown in equation 30.

$$A=UWV^* \tag{30}$$

In equation 30, the asterisk indicates the complex conjugate transpose of matrix V. The pseudo-inverse of A, $A^+$, can be computed from equation 31.

$$A^+=VW^{-1}U^* \tag{31}$$

The pseudo-inverse defined in equation 31 minimizes the error E as dentified in equation 32.

$$E=\|Ax-b\|=\|UWV^*x-b\| \tag{32}$$

The techniques described above are well known to those skilled in the art and are described in significant detail in various linear algebra textbooks and other references. The SVD technique is generally stable and usually behaves in an appropriate manner to provide a solution to the problem described above.

Matrix W in equation 31 may be a square diagonal matrix. Thus, equation 31 can be rewritten in the form of equation 33, wherein the elements of W, $w_j$, are generally known as the singular values. It is possible for one of the singular values, $w_j$, to be valued nearly zero or so numerically small that its value is dominated by round off error.

$$A^+=VW^{-1}U^*=V\times\{\text{diagonal }(1/w_j)\}\times U^* \tag{33}$$

Since the pseudo-inverse of A can be provided by equation 33, it may be singular when $w_j$ is near zero or when $1/w_j$ approaches infinity. A matrix can also be singular, or ill conditioned, if its condition number is too large or infinite. The condition number of the W matrix can be defined as the ratio of the largest singular value to the smallest singular value. It is important that a control strategy evaluate the $w_j$'s to determine if they are near zero or ill-conditioned. To find the pseudo-inverse requires computing the inverse of $w_j$'s, which may be infinity if any one of the $w_j$'s is near or equal to zero. To accommodate this, mathematically, it is possible to set the inverse $(1/w_j)$ of $w_j$ equal to zero for the $w_j$'s that are near or equal to zero. The effect of such a scenario is to discard one of the linear combinations of the matrix equations or to discard the equation set that is corrupted by round off error or an ill-conditioned matrix.

When this is accomplished, the solution for x can be computed utilizing the pseudo-inverse from equation 33. A control strategy first evaluates all the $w_j$'s for a near-zero condition and then sets the inverse of those detected $w_j$'s to zero. In other words, if any of the $w_j$'s is less than a predetermined near-zero parameter, the inverse of that singular value can be set to zero. The near-zero parameter can be based at a minimum on computer truncation and round off sensitivity. More often than not, however, it is dominated by other much larger error sources, such as sensor noise. The next step of such a control strategy is to determine the largest of the $w_j$'s and, based on a ratio parameter, to set the inverses of the non-qualifying $w_j$'s to zero.

The ratio parameter determines the largest acceptable ratio of the largest of the $w_j$'s to the smallest of the $w_j$'s. In other words, if any one of the $w_j$'s is less than a maximum value (i.e., $w_{max}$) divided by the ratio parameter, the inverse of that singular value, $1/w_j$, can be set to zero. The ratio parameter may be set to a value based on test results, because the ill-conditioning may be a function of sensor noise as described herein earlier. Equation 29 represents an ideal case, but it should be realized that the values of x and b most likely contain some error value. This is represented by equation 34, wherein b is the sensor measurement and $\Delta b$ is the associated error.

$$A\times(x+\Delta x)=b+\Delta b \tag{34}$$

Therefore, it can be shown that equation 35 is true where $\Delta b/b$ is the ratio of sensor error to sensor measurement, which can generally result in a 100 percent error or more in determination of x, if equation 36 is true.

$$\frac{\|\Delta x\|}{\|x\|} \leq \frac{w_{max}}{w_{min}} \frac{\|\Delta b\|}{\|b\|} \tag{35}$$

$$\frac{w_{max}}{w_{min}} \geq \frac{\|b\|}{\|\Delta b\|} \tag{36}$$

For example, if a sensor signal contains a 12 percent error and a magnitude of 1.0, the ratio of the sensor signal to the sensor error can be approximately 8.5 and any value of $w_j$, which is less than $w_{max}$ over 8.5, will tend to provide a bad data signal. Thus, its inverse can be set to zero.

Those skilled in the art can appreciate that an implementation of the present invention permits a series of mass counterbalance corrections to be made to a rotatable member. Regarding the construction of matrix A as expressed in equation 8 and 18, each counterbalance mass correction may depend on a prior injection into the cups (i.e., see reference numerals 80 and 82 in FIG. 3) and on the forces and accelerations measured before and after that prior injection.

The final step involved in defining a valid model for the 2 input and 4 sensor example described in equations 8 and 18 is to determine a method by which an action can be pushed in an independent direction. In doing this the amount of mass that can be placed in a location other than the desired counterbalance location must be minimized.

Given two vectors:

$\vec{m}_1 \epsilon C^2$ $\vec{m}_2 \epsilon C^2$ where:

$$\vec{m}_i = \begin{bmatrix} \Delta m_{back}(i) \\ \Delta m_{front}(i) \end{bmatrix} \in C^2,$$

represents the vector of mass placed in the front and back planes for each test i.

The scaling matrix that was used to test for sufficient difference between control actions was $$\begin{bmatrix} \frac{\vec{m}_1}{\|\vec{m}_1\|} & \frac{\vec{m}_2}{\|\vec{m}_2\|} \end{bmatrix}$$

where:

$$\left\| det \begin{bmatrix} \frac{\vec{m}_1}{\|\vec{m}_1\|} & \frac{\vec{m}_2}{\|\vec{m}_2\|} \end{bmatrix} \right\| = 1$$

if the two tests are orthogonal (in two-dimensional complex vector space).

For the balance application, the tests are not required to be completely orthogonal but merely sufficiently different from one another to form a good model of the system. In this case the determinant must be greater than an experimentally determined value φ (phi) in order for the new model to be considered valid.

In the case where the determinant is less than the experimentally determined value φ (phi), the injection must be pushed in a direction that forces the value of the determinant to an acceptable magnitude. Those skilled in the art will appreciate that a number of techniques can be utilized to accomplish this. In a preferred embodiment of the present invention, however, a key factor in determining a vector that satisfies the determinant relationship involves minimizing the distance between the new test vector and the desired injection direction as defined by solving for the required counterbalances in equation 18.

At least two methods may be utilized to solve this problem. The first method is based on the premise that because the scaling matrix shows the relationship between the front and back, a test should be independent from the last test, if the back-to-front ratio is inverted. Similarly, the present test can be sufficiently different than the last one if mass is placed in the axis opposite the axis in which the larger counterbalance was last previously placed. For example, if the back-to-front ratio of the last test is 3:1, then mass is placed only in the front axis for this test. An extension to this method of placing the minimum amount required to perturb the axis in question can be added so that front-to-back ratio of the desired test is compromised to a lesser extent.

A second method involves the determination of a vector $\vec{U}_2$ that is orthogonal to $\vec{m}_2$. These values can be utilized to compute a new test vector $\vec{m}_2'$, which is sufficiently different from $\vec{m}_1$, but at the same time minimizes the amount of mass applied to the spinner, which may not be positioned in the desired counterbalance direction (i.e. the direction of the original $\vec{m}_2$). There are two ways to determine a vector that is orthogonal to $\vec{m}_1$.

The Gram-Schmidt process, well known in the art, can be utilized to determine a vector that is orthogonal to $\vec{m}_1$. The algorithm can be generally described as follows:

Given:

$\vec{m}_1 \epsilon C^2$ $\vec{U}_2 \epsilon C^2$ the goal is to find $\vec{U}_2$ such that $\vec{U}_2 * \cdot \vec{m}_1 = \hat{0}$, 1. Chose a random vector $v \in C^2 \neq \vec{m}_1$
2. Subtract the part of $v \| \vec{m}_1$. Mathematically:

$$\vec{w} = \vec{v} - \frac{\vec{m}_1}{\|\vec{m}_1\|} \left( \frac{\vec{m}_1^* \cdot \vec{v}}{\|\vec{m}_1\|} \right) = \left( I - \frac{\vec{m}_1 \cdot \vec{m}_1^*}{\vec{m}_1^* \cdot \vec{m}_1} \right) 1 \hat{\theta} \quad (37)$$

and $$\vec{U}_2 = \frac{\vec{w}}{\|\vec{w}\|} \quad (38)$$

In order to verify that we did not chose $\vec{v}$ in the direction of $\vec{m}_1$ we can check to verify that $\|\vec{w}\| \geq$ min, where the min is chosen to make sure that the orthogonal vector is large enough.

Another method that can be utilized to determine a vector that is orthogonal to $\vec{m}_1$ involves the use of the singular value decomposition. The solution to the following equation provides the vector $\vec{U}_2$ that is orthogonal to $\vec{m}_1$:

$$[\vec{U}_1 \; \vec{U}_2] \begin{bmatrix} \sigma_1 \\ 0 \end{bmatrix} \vec{v}_1^* = svd(\vec{m}_1) \quad (39)$$

where:

$[\vec{U}_1 \vec{U}_2] \epsilon C^2$ and is 2×2

$\begin{bmatrix} \sigma_1 \\ 0 \end{bmatrix}$ represents the singular value of $\vec{m}_1$, $\vec{v}_1 * \epsilon C^2$ and is 1×1

$$\text{and } \frac{\vec{m}_1}{\|\vec{m}_1\|} = \vec{U}_1 \cdot \vec{v}_1^* \quad (40)$$

In order to define $\vec{m}_2'$ in a direction orthogonal to $\vec{m}_1$ one simply sets $\vec{m}_2' = \vec{U}_2$. It is important, however, to make certain that the amount of balancing fluid that is put in the spinner is minimized in a direction other than that which will provide a counterbalance. In order to force two tests to be different enough that the determinant of the scaling matrix equals φ(phi), the following equation must be solved for α.

$$\left\|det\begin{bmatrix}\frac{\vec{m}_1}{\|\vec{m}_1\|} & \frac{\vec{m}_2'}{\|\vec{m}_2'\|}\end{bmatrix}\right\| = \left\|det\begin{bmatrix}\frac{\vec{m}_1}{\|\vec{m}_1\|} & \frac{\vec{m}_2' + \alpha\vec{U}_2}{\|\vec{m}_2' + \alpha\vec{U}_2\|}\end{bmatrix}\right\| = \phi \quad (41)$$

where:

φ is the experimentally determined difference measure and α provides the scaling factor required to move $\vec{m}_2'$ in a direction that is different enough from $\vec{m}_1$ in complex two dimensional vector space.

Solving for α

$$\left\|det\begin{bmatrix}\frac{\vec{m}_1}{\|\vec{m}_1\|} & \left(\frac{\vec{m}_2 + \alpha\vec{U}_2}{\|\vec{m}_2 + \alpha\vec{U}_2\|}\right)\end{bmatrix}\right\|^2 = \phi^2 \quad (42)$$

$$\left\|\frac{det[\vec{m}_1 \ \vec{m}_2 + \alpha\vec{U}_2]}{\|\vec{m}_1\|\|\vec{m}_2 + \alpha\vec{U}_2\|}\right\|^2 = \phi^2 \quad (43)$$

$\|det[\vec{m}_1 \vec{m}_2 + \alpha\vec{U}_2]\|^2 = \|\vec{m}_1\|^2 \|\vec{m}_2 + \alpha\vec{U}_2\|^2 \phi^2$ $\|det[\vec{m}_1 \vec{m}_2] + det[\vec{m}_1 \alpha\vec{U}_2]\|^2 = \|\vec{m}_1\|^2 \|\vec{m}_2 + \alpha\vec{U}_2\|^2 \phi^2$ $\|det[\vec{m}_1 \vec{m}_2] + \alpha \cdot det[\vec{m}_1 \vec{U}_2]\|^2 = \|\vec{m}_1\|^2 \|\vec{m}_2 + \alpha\vec{U}_2\|^2 \phi^2$ $(det[\vec{m}_1 \vec{m}_2] + det[\vec{m}_1 \vec{U}_2])^* \cdot (det[\vec{m}_1 \vec{m}_2] + \alpha \cdot det[\vec{m}_1 \vec{U}_2]) = \|\vec{m}_1\|^2 \cdot (\vec{m}_2 + \alpha\vec{U}_2)^* \cdot (\vec{m}_2 + \alpha\vec{U}_2) \cdot \phi^2$ $(det[\vec{m}_1 \vec{m}_2]^* + \alpha det[\vec{m}_1 \vec{U}_2]^*)(det[\vec{m}_1 \vec{m}_2] + \alpha det[\vec{m}_1 \vec{U}_2]) = \phi^2 \|\vec{m}_1\|^2 (\vec{m}_2^* + \alpha\vec{U}_2^*)(\vec{m}_2 + \alpha\vec{U}_2)$ $det[\vec{m}_1 \vec{m}_2]^* det[\vec{m}_1 \vec{m}_2] + \alpha(det[\vec{m}_1 \vec{m}_2]^* det[\vec{m}_1 \vec{U}_2] + det[\vec{m}_1 \vec{U}_2]^* det[\vec{m}_1 \vec{m}_2]) + \alpha^2 \|det[\vec{m}_1 \vec{U}_2]\|^2$ $= \phi^2 [\|\vec{m}_1\|^2 [\|\vec{m}_2\|^2 + \alpha(\vec{m}_2^* \vec{U}_2 + \vec{U}_2^* \vec{m}_2) + \alpha^2 \|\vec{U}_2\|^2]]$ Now, moving everything to one side and isolating for α results in the following quadratic equation:

$0 = A\alpha^2 + B\alpha + C$ where $A = [\|det[\vec{m}_1 \vec{U}_2]\|^2 - \phi^2 \|\vec{m}_1\|^2 \|\vec{U}_2\|^2]$ $B = [det[\vec{m}_1 \vec{m}_2]^* det[\vec{m}_1 \vec{U}_2] + det[\vec{m}_1 \vec{U}_2]^* det[\vec{m}_1 \vec{m}_2] + \phi^2 \|\vec{m}_1\|^2 (\vec{m}_2^* \vec{U}_2 + \vec{U}_2^* \vec{m}_2)]$ and $C = \|det[\vec{m}_1 \vec{m}_2]\|^2 - \phi^2 \|\vec{m}_1\|^2 \|\vec{m}_2\|^2$ The foregoing thus can provide two solutions for α. The smallest α is chosen so that the minimum distance is moved along the vector orthogonal to $\vec{m}_1$ (i.e. along $\vec{U}_2$).

Based on the foregoing, those skilled in the art can appreciate that the present invention overcomes the problems derived from long spin-up times associated with balancing a rotating apparatus or system. Previous solutions to this problem involved balancing by injecting balancing fluid into one plane (i.e., either the front or the back) at a time. By simultaneously injecting fluid mass into both planes, the time required to balance the apparatus can be significantly reduced. Potential uses for this invention include any centrifuge operation where a balanced condition is required. Those skilled in the art can further appreciate that the present invention is not limited to cases in which the injection of fluid is utilized to achieve a balanced condition or state. The present invention can be integrated with any type of balancing substance for placement in a known location on a rotating system with two or more possible input planes.

Figure 10:
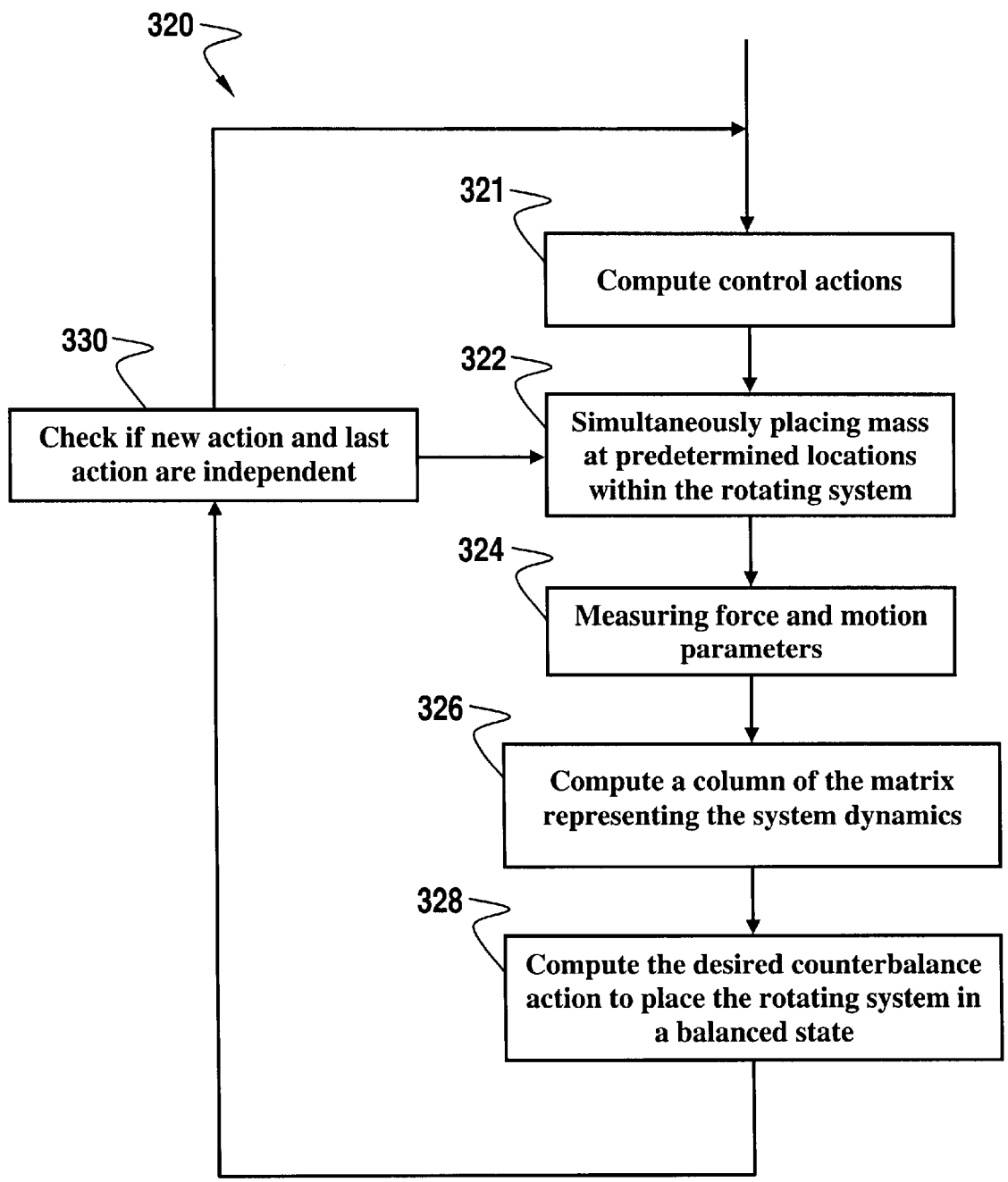
FIG. 10 illustrates a high-level flow chart of operations illustrative of operational steps that can be utilized in accordance with preferred embodiments of the present invention.
Figure 11:
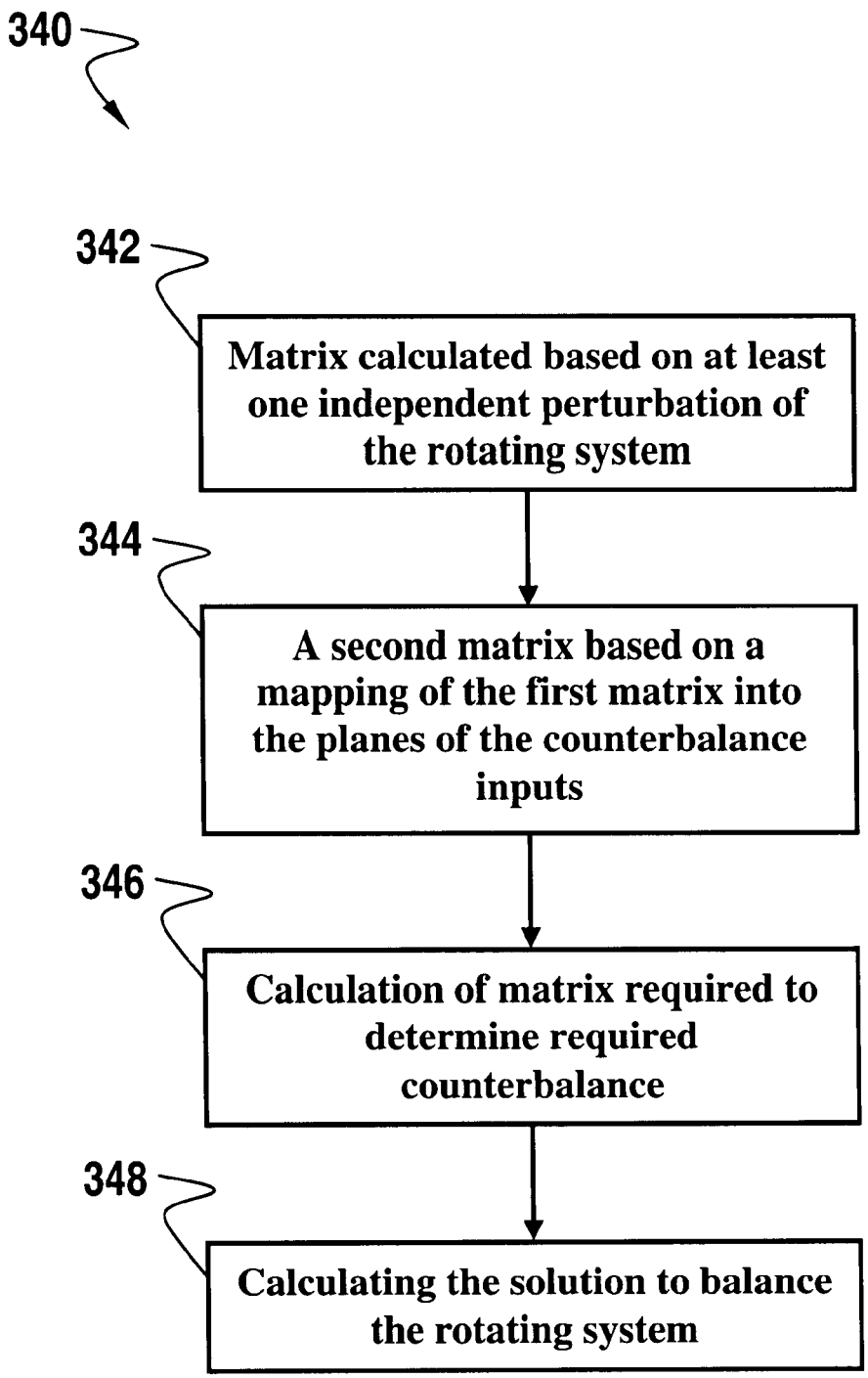
FIG. 11 depicts a high-level flow chart of operations illustrative of additional operational steps that can be utilized in accordance with preferred embodiments of the present invention.

FIG. 10 depicts a high-level flow chart 320 illustrating operational steps that can be utilized in accordance with the present invention. Those skilled in the art can appreciate that flow chart 320 depicts one possible operational method that can be utilized to implement an embodiment of the present invention. Other operational methodologies can also be utilized to implement embodiments of the present invention. Flow chart 320 of FIG. 10 and flow chart 340 of FIG. 11 are thus presented for illustrative purposes only. FIG. 10 and FIG. 11 depict general methods for balancing a rotating system or rotating device having a rotatable member and a shaft attached to the rotatable member. Balancing is generally based on the system response to concurrent control actions or simultaneous injections to place mass at predetermined locations within the rotating system or rotating device.

As illustrated at block 321, test injections are generally computed and thereafter, as illustrated at block 322, mass can be simultaneously placed at predetermined locations within the rotating system. In such simultaneous control actions, the masses are independent of one another in a manner necessary to excite the rotating system in independent directions. The predetermined locations within the rotating system can comprise front and back locations of the rotating system but can also comprise other locations within the rotating system. The front and back locations (i.e., front and back planes) represent a preferable, but not necessarily the only, predetermined locations within the rotating system in which mass can be simultaneously placed.

Thus, as illustrated at block 324, force can be measured at predetermined locations within the rotating system in response to simultaneously placing the mass at the predetermined locations within the rotating system. Note that the number of times mass is simultaneously placed at predetermined locations within the rotating system is based on the number of independent inputs or apparent inputs in the rotating system. Those skilled in the art can appreciate that, if more than two additional independent inputs are utilized, then more than two test injections may also be utilized. In order to simultaneously place mass into all the input planes there must be a matrix mapping from the sensor space to the independent input space. In a preferred embodiment of the present invention, the independent inputs are generally the front and back planes of the rotating body. As also depicted at block 324, motion, e.g., acceleration, can be measured at predetermined locations within the rotating system in response to simultaneously placing mass at predetermined locations within the rotating system.

As described at block 326, a matrix model of measured force and acceleration parameters can be calculated in response to simultaneously placing mass at predetermined locations within the rotating system in order to determine a required correction necessary toplace the rotating system in a balanced state. Those skilled in the art can appreciate that the matrix may be calculated to include other parameters of the rotating system, such as displacement, velocity, and torsion parameters. Also, the measured force and acceleration parameters may be utilized to calculate displacement, velocity, torsion, and other system parameters.

As indicated thereafter at block 328, the desired counterbalance action required to place the rotating system or rotating device in a balanced state can be computed. Thereafter, as depicted at block 330, an angle criterion can be formulation to verify that the control actions constitute independent vectors. The independence or rank criterion is formulated to determine whether consecutive control actions are different enough from previous control actions (i.e., can excite the system in independent directions) to determine if the matrix comprises a model sufficiently representative of the dynamics of the rotating system or rotating device requiring balancing. As explained herein, the formulation of such an independence or rank criterion can involve the determination of a complex vector angle between two test vectors or the rank of a matrix containing more than two test vectors.

FIG. 11 illustrates a high-level flow chart 340 of operations illustrating operational steps that may be processed in accordance with the present invention. The operations described in FIG. 11 illustrate further operational steps that can be followed to calculate the matrix model described above. Thus, as depicted at block 342, the matrix of measured force and acceleration parameters can be calculated based on at least one independent perturbation of the rotating system. As depicted at block 344, a second matrix can be constructed to map the first matrix into the independent input planes. Then, as depicted at block 346, the two matrices illustrated at blocks 342 and 344 can be combined to create the system of equation 28, which can be solved to determine the required counterbalance action for the system as illustrated at block 348.

Figure 12:
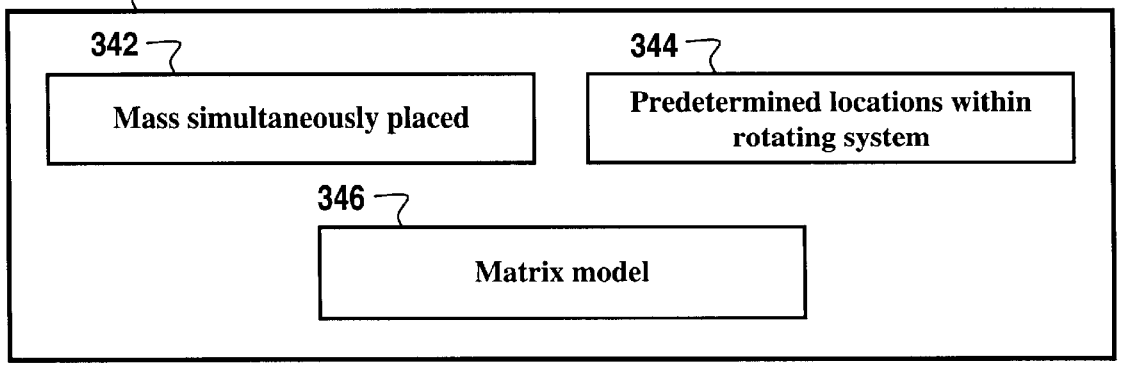
FIGS. 12, 13, and 14 depict high-level system diagrams illustrating systems utilizing simultaneous mass placement for balancing in accordance with preferred embodiments of the present invention.
Figure 13:
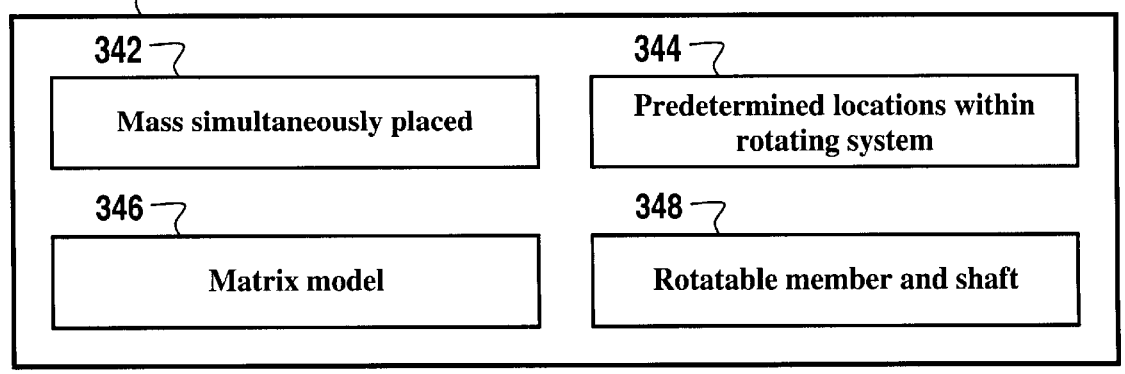
Figure 14:
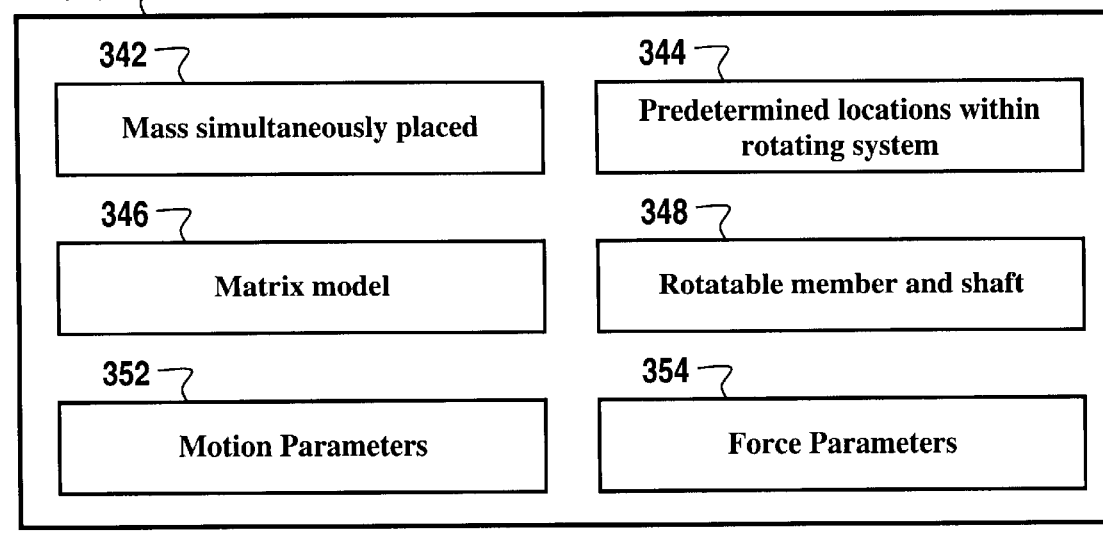

FIGS. 12, 13, and 14 illustrate high-level system diagrams illustrating systems utilizing simultaneous injection techniques for balancing rotating devices or rotating systems in accordance with preferred embodiments of the present invention. Note that in FIGS. 12 to 14, like parts are indicated by like reference numerals. Those skilled in the art can appreciate that FIGS. 12 to 14 depict one possible system that may be implemented in accordance with the present invention. Other systems can also be implemented in accordance with preferred embodiments of the present invention. FIGS. 12 to 14 are, thus, presented for illustrative purposes only and depict general systems for balancing a rotating device or rotating system having a rotatable member and a shaft attached to the rotatable member. Balancing is generally based on the system's response to simultaneous placement of mass at predetermined locations within the rotating system or rotating device.

FIG. 12 thus illustrates a system 340 wherein balancing is based on the system's response to simultaneous placement of mass at predetermined locations wwithin a rotating system or rotating device (e.g., a self-balancing rotatable apparatus). As indicated at block 342, mass can be simultaneously placed at predetermined locations, depicted at block 344, within system 340. A matrix model 346 of measured force and motion parameters can be calculated in response to simultaneously placing mass at predetermined locations within the rotating system, in order to determine a required correction necessary to place the rotating system in a balanced state. Matrix model 346 is generally a system model of measured force and motion parameters. FIG. 13 illustrates a modification to system 340 of FIG. 12. In FIG. 13, system 350 comprises a rotating device or rotating system having a rotatable member and a shaft attached to the rotatable member, as illustrated at block 348. Note that system 350 of FIG. 13 is analogous to system 340 of FIG. 12. In FIG. 14, a system 370 illustrates the fact that motion parameters 352 and force parameters 354 can be measured to calculate matrix 346. System 370 is analogous to systems 340 and 350.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. For example, those skilled in the art can appreciate that the methods described herein, including mathematical formulations, can be implemented as a program product in the form of varying software modules, routines, and subroutines. Many modifications and variations are possible in light of the above teaching without departing from scope of the following claims. It is contemplated that the use of the present invention can involve components having different characteristics. It is intended that the scope of the present invention be defined by the claims appended hereto, giving full cognizance to quivalents in all respects.

The embodiments of an invention in which an exclusive property or right is claimed are defined as follows:

1. A method for balancing a rotating system having a rotatable member and a shaft attached to said rotatable member, wherein balancing is based on the response of said rotating system to concurrent control actions for placing mass at predetermined locations within said rotating system, said method comprising the steps of:

simultaneously placing mass at predetermined locations within said rotating system; and calculating a system model based on measured force and motion parameters in response to simultaneously placing mass at predetermined locations within said rotating system in order to determine a required correction necessary to place said rotating system in a balanced state.

2. The method of claim 1 further comprising the step of:

measuring force at predetermined locations within said rotating system in response to simultaneously placing said mass at said predetermined locations within said rotating system.

3. The method of claim 1 further comprising the step of:

measuring motion at predetermined locations within said rotating system in response to simultaneously placing said mass at predetermined locations within said rotating system.

4. The method of claim 1 wherein the step of simultaneously placing ass at predetermined locations within said rotating system, further comprises the step of:

simultaneously placing mass at predetermined locations within said rotating system, while maintaining front and back planes of said rotating system as independent inputs.

5. The method of claim 1 wherein the step of calculating said system model of measured force and motion parameters further comprises the step of:

calculating said system model based on at least one independent perturbation of said rotating system.

6. The method of claim 5 wherein the step of calculating said system model based on at least one independent perturbation of said rotating system, further comprises the step of:
formulating a matrix based on at least one independent mapping, including:
a first matrix of sensor measurements normalized by a magnitude of control actions; and
a second matrix comprising a mapping of said first matrix into planes of at least one counterbalance input.

7. The method of claim 1 wherein the step of calculating said system model of measured force and motion parameters, further comprises the step of:
formulating an independence criterion to determine whether consecutive control actions are different enough from one another to form a model that is sufficiently representative of the dynamics of said rotating system.

8. The method of claim 1 wherein the step of calculating said system model of measured force and motion parameters, further comprises the step of:
modifying said consecutive control actions to differentiate said consecutive control actions from one another if said consecutive control actions are not different from one another, thereby permitting utilization of said independence criterion to form a model that is sufficiently representative of the dynamics of said rotating system.

9. The method of claim 1 wherein the step of simultaneously placing mass at predetermined locations within said rotating system, further comprises the step of:
simultaneously placing mass at predetermined locations within said rotating system, wherein masses simultaneously placed at said predetermined locations are independent of one another in a manner necessary to excite said rotating system in independent directions.

10. The method of claim 1 wherein the step of simultaneously placing mass at predetermined locations within said rotating system, further comprises the step of:
simultaneously placing mass at predetermined locations within said rotating system, wherein said predetermined locations within said rotating system comprise front and back locations of said rotating system.

11. A method for balancing a washing appliance having a rotatable member and a shaft attached to said rotatable member, wherein balancing is based on the response of said washing appliance to concurrent control actions for placing mass at predetermined locations within said washing appliance, comprising:
simultaneously placing mass at predetermined locations within said washing appliance;
measuring force at predetermined locations within said washing appliance in response to simultaneously placing said mass at said predetermined locations within said washing appliance;
measuring motion at predetermined locations within said washing appliance in response to simultaneously placing said mass at predetermined locations within said washing appliance; and
calculating a system model based on measured force and motion parameters in response to simultaneously placing mass at predetermined locations within said washing appliance in order to determine a required correction necessary to place said washing appliance in a balanced state.

12. A method for balancing a washing appliance having a rotatable member and a shaft attached to said rotatable member, wherein balancing is based on simultaneous control actions to place fluid at predetermined locations within said washing appliance, said method comprising the steps of:
simultaneously placing fluids at predetermined locations within said washing appliance, wherein said fluids are independent of one another in a manner necessary to excite said washing appliance in independent directions; and
formulating an independence criterion to determine whether consecutive control actions are different enough from one another to form a model that is sufficiently representative of the dynamics of said washing appliance;
modifying said consecutive control actions to differentiate said consecutive control actions from one another, if said consecutive control actions are not different from one another, thereby permitting utilization of said independence criterion to form a model that is sufficiently representative of the dynamics of said washing appliance;
measuring force at predetermined locations within said washing appliance in response to simultaneously placing said fluids at said predetermined locations within said washing appliance;
measuring motion at predetermined locations within said washing appliance in response to simultaneously placing said fluids at predetermined locations within said washing appliance; and
calculating a system model based on measured force and motion parameters based on at least one independent perturbation of said washing appliance in response to simultaneously placing fluids at predetermined locations within said washing appliance in order to determine a required correction necessary to place said washing appliance in a balanced state.

13. A system for balancing a rotating device having a rotatable member and a shaft attached to said rotatable member, wherein balancing is based on simultaneous control actions to place mass at predetermined locations within said rotating device, said system comprising:
mass simultaneously placed at predetermined locations within said rotating device; and
a matrix model of measured force and motion parameters calculated in response to simultaneously placing mass at predetermined locations within said rotating device in order to determine a required correction necessary to place said rotating device in a balanced state.

14. The system of claim 13 further comprising:
force parameters measured at predetermined locations within said rotating device in response to simultaneously placing said mass at said predetermined locations within said rotating device.

15. The system of claim 13 further comprising:
motion parameters measured at predetermined locations within said rotating device in response to simultaneously placing said mass at predetermined locations within said rotating device.

16. The system of claim 13 wherein said mass is simultaneously placed at predetermined locations within said rotating device, while maintaining front and back planes of said rotating device as independent inputs.

17. The system of claim 13 wherein said matrix is calculated based on at least one independent perturbation of said rotating device.

18. The system of claim 17 wherein said matrix model of measured force and motion parameters is calculated based on at least one independent mapping, including:
- a first matrix of sensor measurements normalized by a magnitude of control actions; and
- a second matrix comprising a mapping of said first matrix into planes of at least one counterbalance input.

19. The system of claim 13 wherein said matrix is calculated utilizing an independence criterion to determine whether consecutive control actions are different enough from one another to form a matrix model that is sufficiently representative of the dynamics of said rotating device.

20. The system of claim 13 wherein said matrix is calculated by modifying said consecutive control actions to differentiate said consecutive control actions from one another, if said consecutive control actions are not different from one another, thereby permitting utilization of said independence criterion to form a model that is sufficiently representative of the dynamics of said rotating device.

21. The system of claim 13 wherein said mass is simultaneously placed at predetermined locations within said rotating device, such that masses simultaneously placed at said predetermined locations are independent of one another in a manner necessary to excite said rotating device in independent directions.

22. The system of claim 13 wherein said mass is simultaneously placed at predetermined locations within said rotating device, wherein said predetermined locations within said rotating device comprise front and back locations of said rotating device.

23. A system for balancing a washing appliance having a rotatable member and a shaft attached to said rotatable member, wherein balancing is based on simultaneous control actions to place mass at predetermined locations within said washing appliance, said system comprising:
- mass simultaneously placed at predetermined locations within said washing appliance;
- force parameters measured at predetermined locations within said washing appliance in response to simultaneously placing said mass at said predetermined locations within said washing appliance;
- motion parameters measured at predetermined locations within said washing appliance in response to simultaneously placing said mass at predetermined locations within said washing appliance; and
- a matrix model of measured force and motion parameters calculated in response to simultaneously placing mass at predetermined locations within said washing appliance in order to determine a required correction necessary to place said washing appliance in a balanced state.

24. A system for balancing a washing appliance having a rotatable member and a shaft attached to said rotatable member, wherein balancing is based on simultaneous control actions to place fluid at predetermined locations within said washing appliance, said system comprising:
- fluids simultaneously placed at predetermined locations within said washing appliance, wherein said fluids are independent of one another in a manner necessary to excite said washing appliance in independent directions; and
- an independence criterion utilized to determine whether consecutive control actions are different enough from one another to form a model that is sufficiently representative of the dynamics of said washing appliance;
- said consecutive control actions modified to differentiate said consecutive control actions from one another, if said consecutive control actions are not different from another, thereby permitting utilization of said independence criterion to form a model that is sufficiently representative of the dynamics of said washing appliance; and
- a matrix model of measured force and motion parameters calculated based on at least one independent perturbation of said washing appliance, in response to simultaneously placing said fluids at predetermined locations within said washing appliance in order to determine a required correction necessary to place said washing appliance in a balanced state.

* * * * *